United States Patent
Yuzurihara et al.

(10) Patent No.: US 8,730,700 B2
(45) Date of Patent: May 20, 2014

(54) CURRENT SOURCE INVERTER AND METHOD FOR CONTROLLING CURRENT SOURCE INVERTER

(75) Inventors: Itsuo Yuzurihara, Zama (JP); Toshiyuki Adachi, Ebina (JP); Shinichi Kodama, Yokohama (JP)

(73) Assignee: Kyosan Electric Mfg. Co., Ltd., Yokohama-shi (JP)

( * ) Notice: Subject to any disclaimer, the term of this patent is extended or adjusted under 35 U.S.C. 154(b) by 0 days.

(21) Appl. No.: 14/000,077

(22) PCT Filed: Feb. 23, 2012

(86) PCT No.: PCT/JP2012/054400
§ 371 (c)(1),
(2), (4) Date: Aug. 16, 2013

(87) PCT Pub. No.: WO2013/125004
PCT Pub. Date: Aug. 29, 2013

(65) Prior Publication Data
US 2014/0009969 A1 Jan. 9, 2014

(51) Int. Cl.
*H02M 7/217* (2006.01)
*H02M 7/5387* (2007.01)
*H02H 7/122* (2006.01)
*H02M 3/335* (2006.01)

(52) U.S. Cl.
USPC ...... 363/127; 363/132; 363/56.03; 363/21.02

(58) Field of Classification Search
USPC ............... 363/15–17, 21.02, 21.03, 124, 127, 363/132, 133
See application file for complete search history.

(56) References Cited

FOREIGN PATENT DOCUMENTS

| JP | 04-317564 A | 11/1992 |
| JP | 06-284749 A | 10/1994 |
| JP | 08-298777 A | 11/1996 |
| JP | 11-332249 A | 11/1999 |
| JP | 2002-325464 A | 11/2002 |
| JP | 2004-23881 A | 1/2004 |
| JP | 2010-172183 A | 8/2010 |

OTHER PUBLICATIONS

International Search Report dated May 22, 2013, issued in corresponding application No. PCT/JP2012/054400.
Written Opinion dated May 22, 2013, issued in corresponding application No. PCT/JP2012/054400.

*Primary Examiner* — Bao Q Vu
*Assistant Examiner* — Zekre Tsehaye
(74) *Attorney, Agent, or Firm* — Westerman, Hattori, Daniels & Adrian, LLP

(57) ABSTRACT

In controlling switching elements of a current source inverter, a switching loss in the switching element is prevented according to a normal switching operation for a commutation operation, without requiring any particular control.

In the commutation operation of the current source inverter, a timing for driving the switching elements is controlled in such a manner that an overlap period is generated, during when both a switching element at the commutation source and a switching element at the commutation target are set to be the ON state, a resonant circuit is controlled based on the control of the switching elements having this overlap period, and resonant current of the resonant circuit reduces the switching loss upon commutation operation of the switching elements. By controlling the generation of the resonant current of the resonant circuit by using the control of the switching elements having the overlap period, the resonant current generated by this control renders current and voltage of the switching element at the commutation source to zero when commutation is performed, thereby reducing the switching loss in the commutation operation.

8 Claims, 17 Drawing Sheets

FIG. 3A OPERATION MODE A
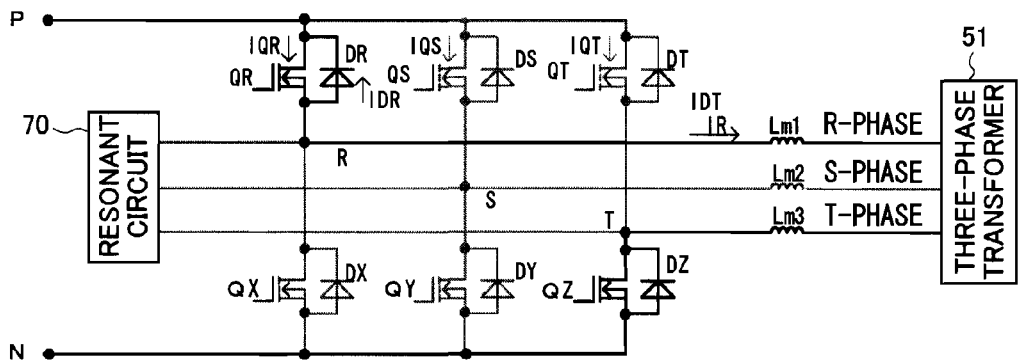
FIG. 3B OPERATION MODE B
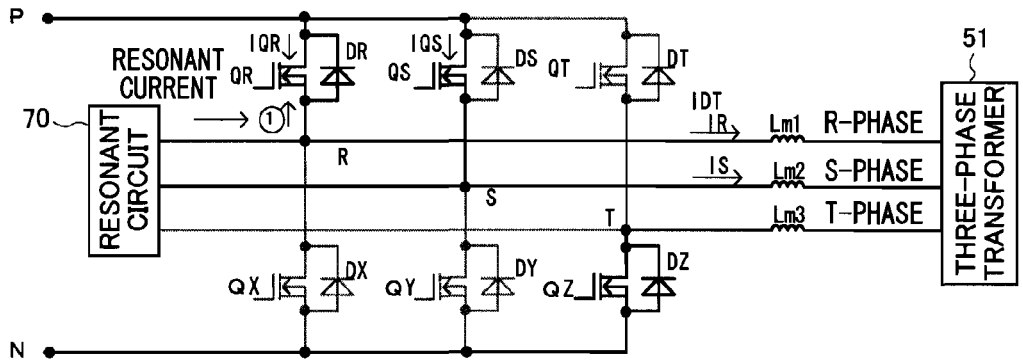
FIG. 3C OPERATION MODE C
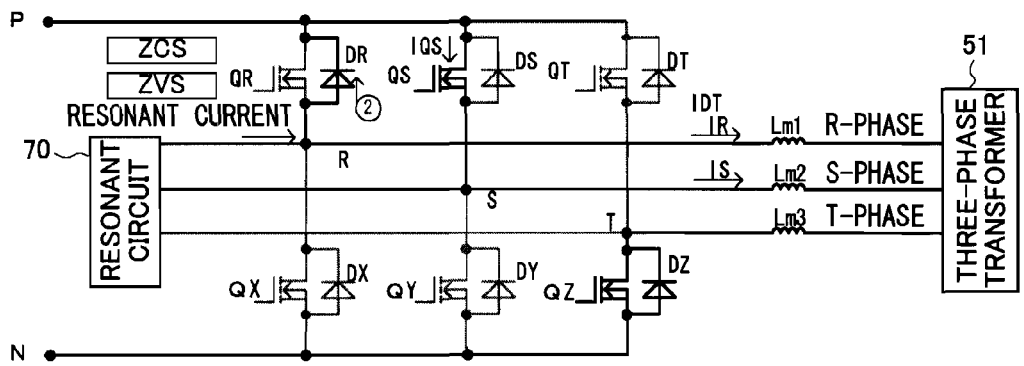
FIG. 3D OPERATION MODE D
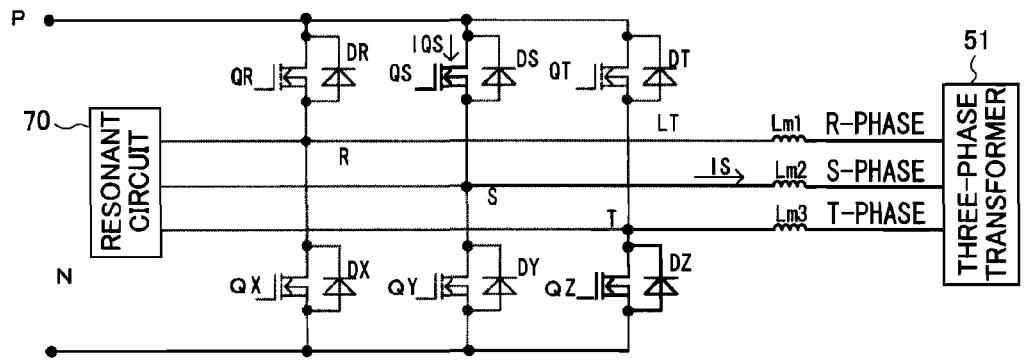

FIG. 4A
GATE PULSE SIGNAL G_R OF Q_R
FIG. 4B
GATE PULSE SIGNAL G_S OF Q_S
FIG. 4C
CURRENT I_QR FLOWING IN Q_R
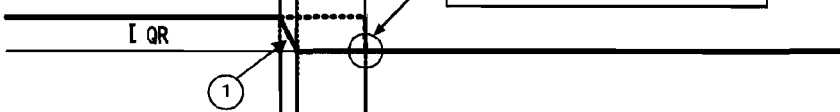
CURRENT I_QR WHEN Q_R IS TURNED OFF
FIG. 4D
CURRENT I_QS FLOWING IN Q_S
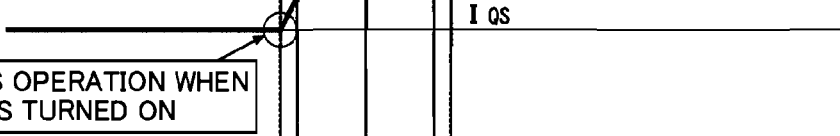
ZCS OPERATION WHEN Q_S IS TURNED ON
FIG. 4E
CURRENT I_DR FLOWING IN D_R
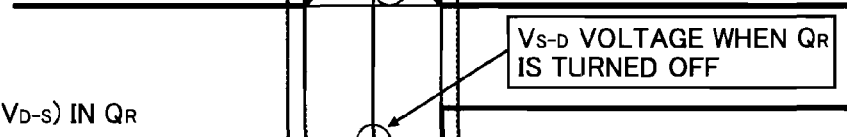
V_S-D VOLTAGE WHEN Q_R IS TURNED OFF
FIG. 4F
VOLTAGE V_DR (V_D-S) IN Q_R
FIG. 4G
RESONANT CURRENT
FIG. 4H
PRIMARY CURRENT IN R PHASE I_R
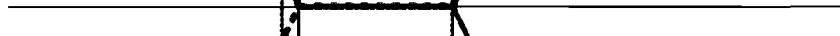
PRIMARY CURRENT IN S PHASE I_S
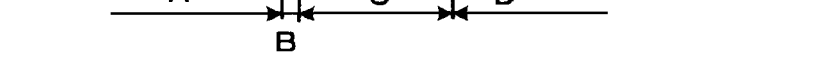

$$Lc_e = \frac{1}{3}Lc$$

$$CL_e = 3CL$$

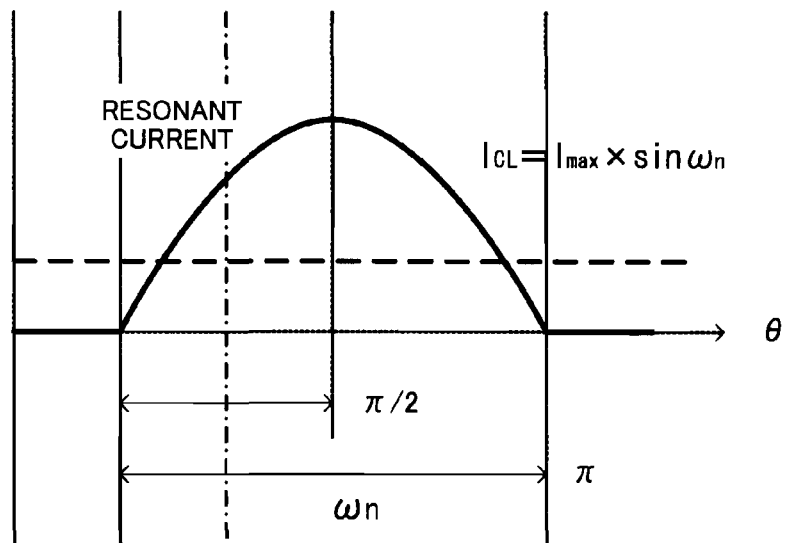
FIG. 7A
PRIMARY CURRENT
IN R PHASE $I_R$
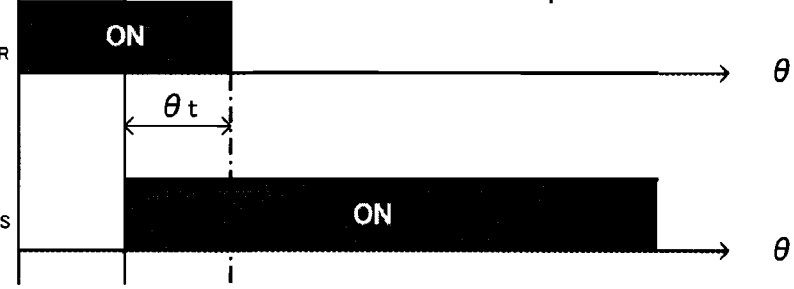
FIG. 7B
GATE PULSE SIGNAL $G_R$
FIG. 7C
GATE PULSE SIGNAL $G_S$ $$L_e = \frac{2}{3} L_c$$

$$C_e = \frac{3}{2} C_L$$

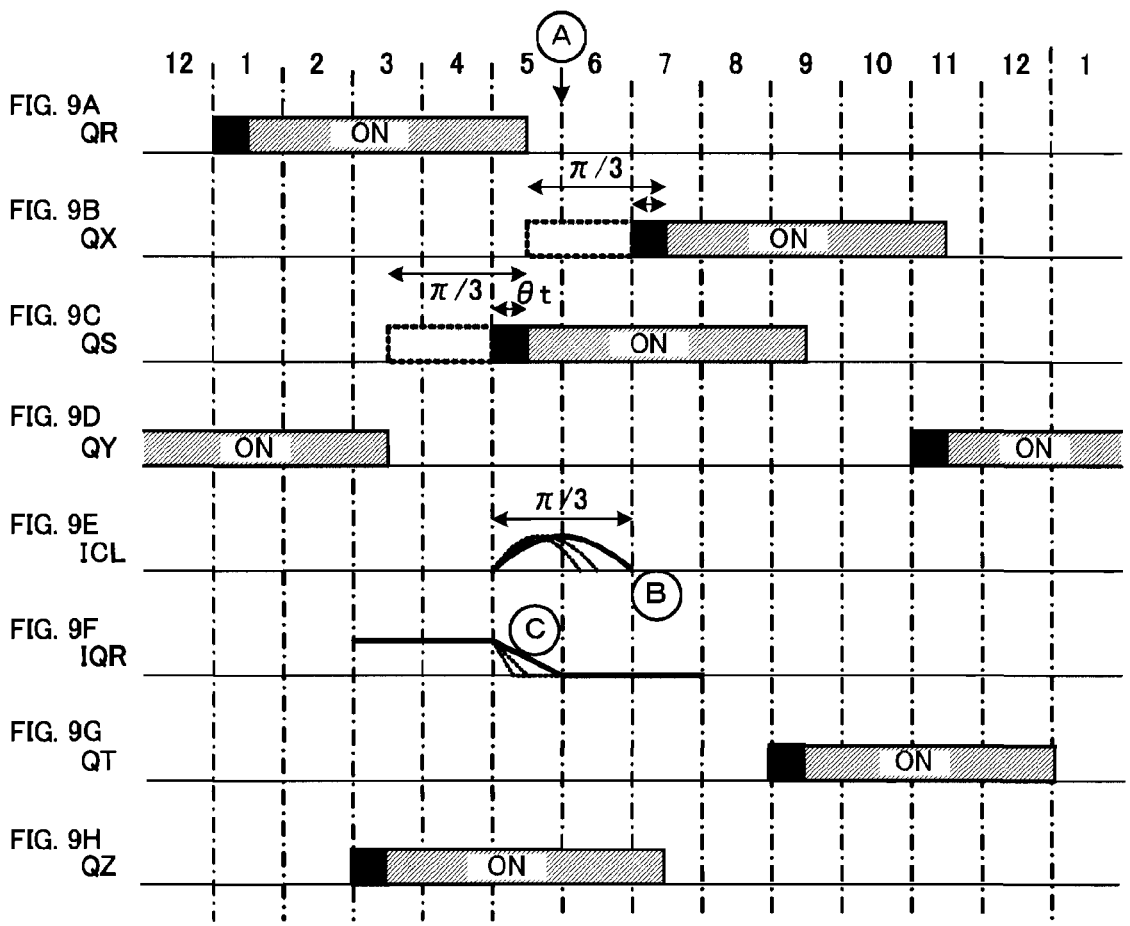
A CONDITION FOR PREVENTING SHORT CIRCUIT : $\pi/3 > \theta t (= \omega I \times Tn)$
B CONDITION FOR RESONANT CURRENT $I_{CL}$ NOT TO RELATE TO THE NEXT MODE : $\sqrt{L_C C_L} < 1/(3\omega I)$
C CONDITION FOR RENDERING $I_{QR}$ TO ZERO BEFORE LAPSE OF $\theta t$ : $\sin(\theta t) > I_{QR}/I_{max}$

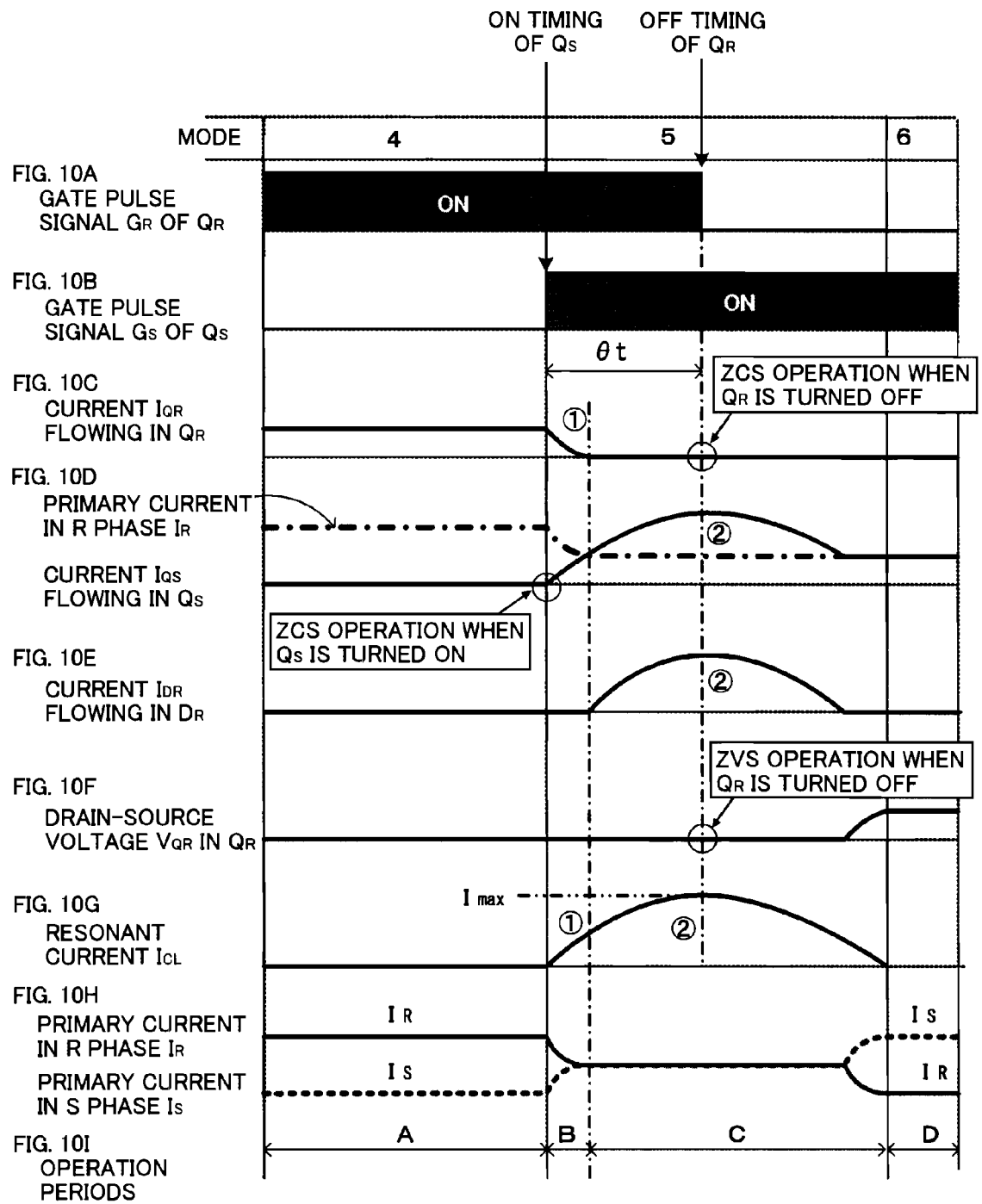

OPERATION PERIOD A

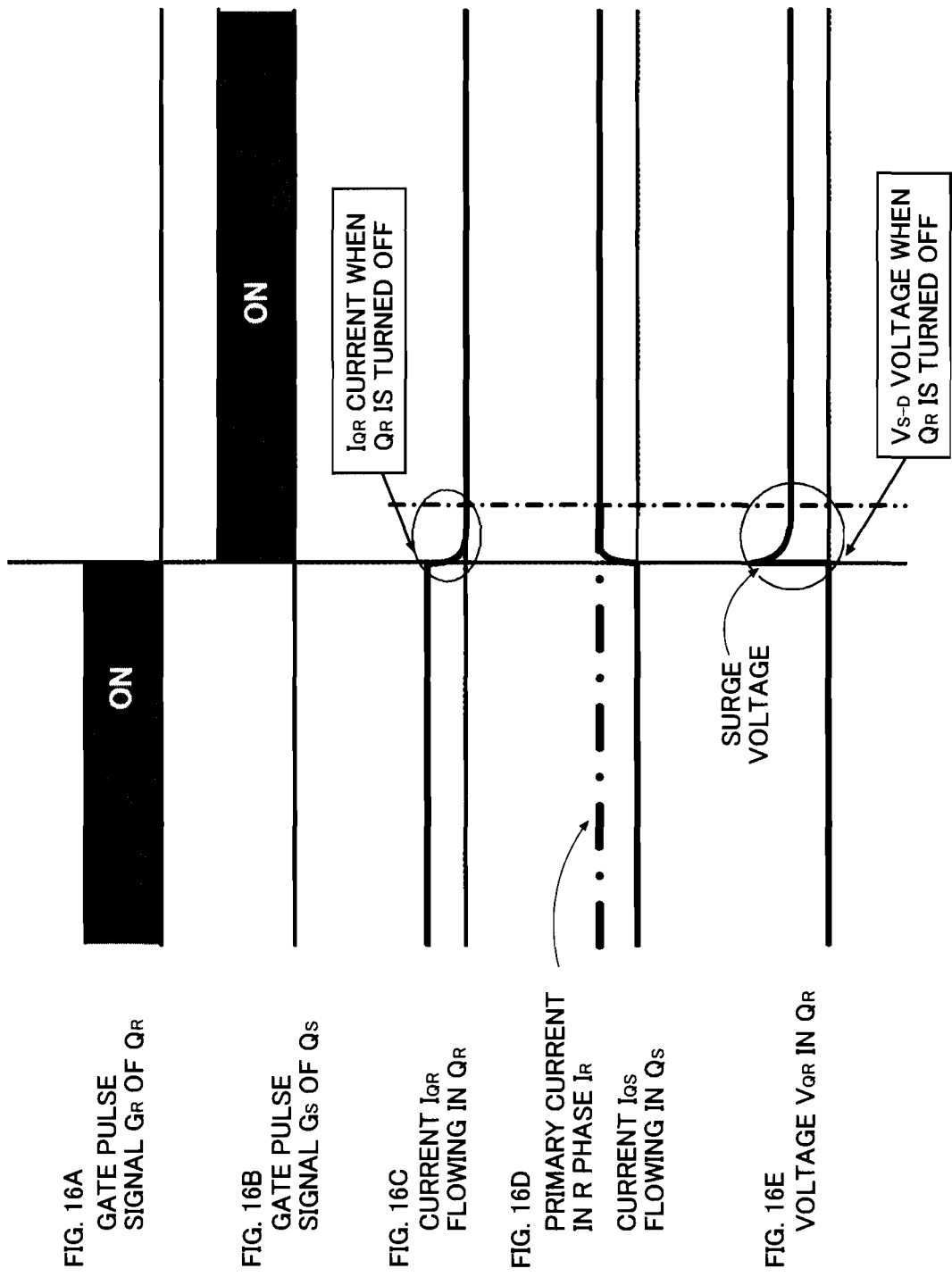

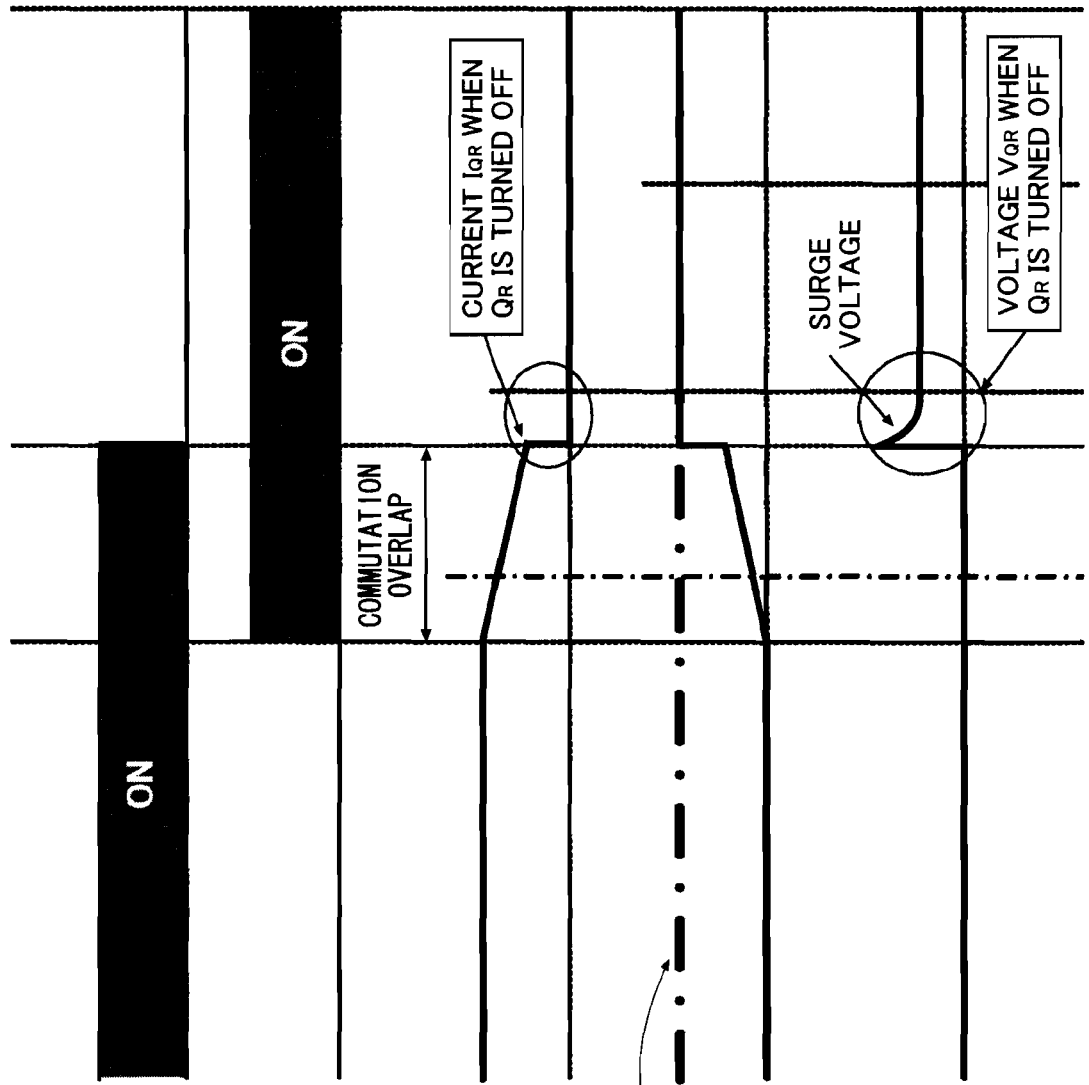

CURRENT SOURCE INVERTER AND METHOD FOR CONTROLLING CURRENT SOURCE INVERTER

TECHNICAL FIELD

The present invention relates to a current source inverter for supplying current to a load such as a plasma load, for example, and a method for controlling the current source inverter.

BACKGROUND ART

A current source inverter is provided with a DC reactor connected to a DC source, a converter for converting DC power from the DC reactor into AC power, and a controller for performing a drive control of switching elements in the converter, and this current source inverter is characterized in that it operates on reducing fluctuations of load impedance caused by a load short or the like, since the inverter is allowed to be treated as a current source when viewed from the load side. By way of example, in the case of plasma load, the inverter operates to maintain the plasma.

The current source inverter has such an advantage as supplying current stably to the load, even when the load fluctuates as described above, it is suitable for supplying power to the plasma load where impedance varies depending on circumstances.

For example, when the plasma load changes to open-condition with arc-extinguishing of the plasma, a voltage for the plasma load increases in the current source inverter. This voltage increase acts for promoting plasma ignition, thereby facilitating the ignition. On the other hand, in the case where an arc is generated on the load side and the plasma load changes to short-condition, the current source inverter supplies a steady current to the load, and thus suppressing excessive supply of current to the plasma load. Therefore, it is possible to reduce damage on the plasma load.

FIG. 15 illustrates one configuration example of the current source inverter. In FIG. 15, the current source inverter 100 is provided with a current source step-down type chopper circuit 101, a three-phase inverter circuit 102, and a three-phase transformer 103. The current source step-down type chopper circuit 101 performs chopper control of a switching element Q1, thereby stepping down DC, being inputted from an AC source and a rectifier circuit not illustrated, smoothing the current in a DC reactor LF1, and inputting the current into the three-phase inverter circuit 102.

As a chopper circuit for performing DC-AC conversion, a current source step-down and -up type chopper circuit may be employed, instead of the current source step-down type chopper circuit 101.

The three-phase inverter circuit 102 controls at a predetermined timing, arc striking and arc extinguishing of the switching elements $Q_R$, $Q_S$, $Q_T$, $Q_X$, $Q_Y$, and $Q_Z$, thereby causing commutation between the elements, so as to supply AC power to the three-phase transformer 103.

This current source inverter has a problem that when all the switching elements break the passage of electric current, there is a possibility that current from the DC reactor applies overvoltage on the switching elements and causes element destruction. There is another problem that at the time of commutation, current and voltage are generated on the switching elements, and this may cause the element destruction.

There are known following techniques so as to prevent such destruction of the switching elements due to an accident of load short; a technique for detecting load current to obtain a current-carrying period, and controlling the switching elements during this current-carrying period, and a technique for detecting the current flowing in the switching elements and controlling the switching elements based on the current being detected (see Patent Document 1).

There is also known a technique which is proposed to solve problems of surge voltage occurrence and switching loss due to current interruption, and this technique obtains a current overlap time when the current in the switching elements being a commutation source becomes zero at a zero cross point of the load voltage, and starts the commutation in the switching element being a target of the commutation at a point of time earlier than the zero cross point of the load voltage, by the obtained current overlap time (see Patent Document 2).

FIG. 16 and FIG. 17 illustrate the switching loss at the time of commutation in the circuit operation shown in FIG. 15. FIG. 16 illustrates the case where the commutation is performed, without overlapping of the ON state between the switching element being the commutation source and the switching element being the commutation target. In this example, the switching element $Q_R$ is assumed as the commutation source, the switching element $Q_S$ is assumed as the commutation target, and gate pulse signals $G_R$ and $G_S$ set those elements to be the ON state, respectively (FIG. 16A and 16B). Since a falling edge of the gate pulse signal $G_R$ agrees with a rising edge of the gate pulse signal $G_S$, commutation between the switching elements is performed without overlapping. Here, as shown in FIG. 16C and 16E, the time constants of the current $I_{QR}$ and the voltage $V_{QR}$ (drain-to-source voltage of the switching element) flowing in the switching element $Q_R$ at the commutation source, change at the time of being turned OFF, under the influence of wiring inductance, element capacity, load inductance, and the like. Therefore, they do not achieve ZCS and ZVS at the time of commutation, and a switching loss occurs. In addition, surge voltage is generated, and this may cause damage on the switching element.

Even though an overlap period is provided, during when the ON state of the switching element being the commutation source and the ON state of the switching element being the commutation target overlap each other at the time of commutation, as shown in FIG. 17C and 17E, they do not achieve ZCS and ZVS at the time of commutation, and the switching loss occurs.

There is known a resonant inverter as a soft switching inverter for reducing the switching loss.

The resonant inverter connects a freewheeling diode and a resonant capacitor with the switching element in parallel, and a resonant circuit is made up of the resonant capacitor, the resonant inductance, and the switching element connected to the resonant circuit. Discharging and charging of the resonant capacitor by the resonant current from the resonant circuit, and conduction of the freewheeling diode achieve ZVS (zero voltage switching) and ZCS (zero current switching) in the switching element (e.g., Patent Document 2).

Since the resonant circuit has a configuration where the resonant capacitor is connected in parallel to the switching element, there is a problem that the capacitor increases in volume. In order to solve the problem above, it is suggested that an auxiliary circuit made up of auxiliary switching elements forms the resonant circuit (Patent Document 3).

PRIOR ART DOCUMENT

Patent Document

[Patent Document 1] Japanese Unexamined Patent Application Publication No. 8-298777

[Patent Document 2] Japanese Unexamined Patent Application
Publication No. 2002-325464
[Patent Document 3] Japanese Unexamined Patent Application Publication No. 2004-23881

DISCLOSURE OF THE INVENTION

Problem to be Solved by the Invention

In the current source inverter conventionally suggested, the timing for driving the switching element is controlled to prevent the switching loss and/or element destruction. Therefore, it is necessary to detect load current, or current in the switching element, for instance. Further in the configuration for controlling the switching element by detecting the current overlap time during when the current of the switching element at the commutation source becomes zero, it is necessary to detect the load current and load voltage so as to detect the current overlap time.

Therefore, there are problems that in any of the configurations above, it is necessary to provide a detector for detecting the current and the voltage, and in addition, it is also required to prepare a control circuit for forming a control signal to control the switching element based on the detected current and the detected voltage, in addition to the control circuit for controlling normal operations of the switching element.

In the case of the resonant inverter, there are problems that it is necessary to connect the resonant capacitor in parallel to the switching element, and it is further necessary to prepare another control circuit for forming a control signal for the switching element used for the resonant circuit, in addition to the control circuit for controlling a normal operation of the switching element.

Therefore, in the conventionally known current source inverter, there is a problem that a control of the switching element is required so as to prevent the switching loss and element destruction, in addition to the control of switching operation that is normally performed for the normal commutation operation. This means that it is necessary to prepare a control circuit to control the switching element for preventing the switching loss and element destruction, in addition to the control circuit for controlling the operation of the switching element, which is performed in the normal commutation operation.

An object of the present invention is to solve the aforementioned conventional problems, and in controlling the switching element in the current source inverter, the switching loss of the switching element is prevented according to a normal switching operation for the commutation, without requiring any particular control.

Means to Solve the Problem

In a commutation operation of a current source inverter, when an overlap period in commutation is generated for setting both a switching element at a commutation source and a switching element at a commutation target to be the ON state, the present invention provides a fixed overlap period in commutation, in which an overlap time duration (phase width) is predetermined so as to obtain an overlap time being sufficient for addressing fluctuation in a load current. Here, being fixed indicates that the time duration (phase width) of the overlap period in commutation is a width that is determined regardless of the load current fluctuation. Setting of the overlap period in commutation controls the timing for driving the switching element. A drive timing control by the overlap period in commutation between the switching elements controls the resonant circuit, and reduces the switching loss at the commutation operation in the switching elements according to resonant current of the resonant circuit.

According to the current source inverter and the inverter control of the present invention, only the timing for driving the switching elements upon commutation is changed, and even in the case where the load current fluctuates, in generating the overlap period in commutation during when both the switching element at the commutation source and the switching element at the commutation target are set to be the ON state, the overlap period in commutation is predetermined so that sufficient overlap time duration (phase component) is obtained, and in addition, the switching elements are controlled within the overlap period in commutation to allow resonant current to flow in the resonant circuit, thereby reducing the switching loss according to the resonant current.

By using the resonant current within the overlap period in commutation, it is not necessary to control the switching element to prevent the switching loss, in addition to the control of the switching operation normally performed for the commutation operation, unlike the conventionally known current source inverter, and a control circuit for preventing the switching loss is not required in addition to the control circuit for controlling the switching element operation performed for the normal commutation operation.

The present invention is directed not only to the generation of the overlap period during when both the switching element at the commutation source and the switching element at the commutation target are set to be the ON state, so as to reduce the switching loss of the switching element. The present invention is also directed to a control of resonant current generation in the resonant circuit by using the control of the switching elements having the overlap period, and according to this resonant current being generated in this control, the current and the voltage of the switching element at the commutation source to be zero upon commutation, thereby reducing the switching loss at the time of the commutation operation.

One aspect of the present invention is directed to a current source inverter, and another aspect of the present invention is directed to a method for controlling the current source inverter.

[Current Source Inverter]

The current source inverter according to the present invention is provided with a current source chopper constituting a DC source, a multiphase inverter for converting DC output from the current source chopper into multiphase AC power according to operations of multiple switching elements, a controller for controlling the current source chopper and the multiphase inverter, and a resonant circuit for supplying resonant current to the switching elements in the multiphase inverter.

The controller controls timing for driving a switching element at the commutation target and a switching element at the commutation source, upon commutation between the switching elements in the multiphase inverter. Controlling of the timing for driving the switching elements allows generation of an overlap period during when both the switching element at the commutation target and the switching element at the commutation source to be set to the ON state, and simultaneously allows the resonant current in the resonant circuit to be controlled.

During the overlap period, the resonant current of the resonant circuit is supplied to the switching element at the commutation source in the reverse biased direction, and it is also supplied to the freewheeling diode in the forward biased direction, the diode being connected to the switching element in inverse-parallel. By supplying this resonant current to the switching element and to the freewheeling diode, zero current and zero voltage are achieved in the switching element at the commutation source during the overlap period, and the commutation operation is performed under the condition of zero current and zero voltage, at the point when the switching element at the commutation source is switched from the ON state to the OFF state.

The current source inverter and the control method thereof according to the present invention are not limited to a three-phase inverter for converting DC power into three-phase AC power, but it is also applicable to a multiphase inverter for converting DC power into optional multiphase AC power, i.e., equal to or more than two-phase AC power.

The resonant circuit according to the present invention is configured in such a manner that an output from the switching element at the commutation target is set as a source for supplying the resonant current, and during the overlap period, the switching element at the commutation target is set to be the ON state before the switching element at the commutation source is set to be the OFF state, thereby introducing the current which flows in the forward direction to the switching element at the commutation target, into the resonant circuit to generate the resonant current.

The resonant circuit of the present invention is provided with current feed ends, the number of which is equal to the number of phases of the AC power being converted by the multiphase inverter. The current feed ends are respectively connected to connection terminals of opposed switching elements in the bridge configuration of the switching elements which form the multiphase inverter.

Upon commutation between the switching elements in the multiphase inverter, current is introduced into the resonant circuit from the current feed end connected to the switching element at the commutation target, and then resonant current is generated. The resonant current generated in the resonant circuit is supplied to the switching element at the commutation source from the current feed end which is connected thereto. The current supplied from the resonant circuit to the switching element at the commutation source is introduced into the switching element at the commutation source in the reverse biased direction.

Since the resonant current introduced into the switching element at the commutation source flows inversely relative to the forward current flowing in the switching element at the commutation source, the resonant current cancels the forward current, thereby rendering the current flowing in the switching element at the commutation source to zero.

In addition, the resonant current also flows into the freewheeling diode, thereby rendering the voltage in the switching element at the commutation source to be zero. The zero current state and the zero voltage state of the switching element at the commutation source are maintained during the overlap period, and switching of the switching element at the commutation source, from the ON state to the OFF state is carried out under the condition of zero current and zero voltage, thereby achieving the commutation according to ZCS and ZCS.

The circuit of the resonant circuit according to the present invention may be configured in such a manner that an LC series circuit is provided in each between terminals which are formed by the current feed ends, for instance. The LC series circuit inputs forward current of the switching element at the commutation target, upon commutation between the switching elements of the multiphase inverter, and generates resonant current, and supplies the resonant current thus generated to the switching element at the commutation source in the reverse biased direction.

In the case where the multiphase inverter of the present invention converts DC power into n-phase AC power, it is assumed that in the resonant circuit, reactance L and capacitance C of the LC series circuit constituting the resonant circuit satisfies the condition of $(L \times C)^{1/2} > \pi/n$, so that the resonant current does not flow in another switching element which is set to be the ON state next. When the multiphase inverter is a three-phase inverter circuit, the condition which the reactance L and capacitance C of the LC series circuit are required to satisfy is; $(L \times C)^{1/2} > \pi/3$.

If the reactance L and the capacitance C satisfy this condition, a phase component which corresponds to a half-wavelength of the resonant current attenuates before the next switching element is set to be the ON state, and accordingly, it is possible to prevent influence caused by the resonant current.

Further in the case where the multiphase inverter of the present invention converts DC power into n-phase AC power, it is assumed that the phase component θt during the overlap period satisfies $\pi/2n > \theta t$ as a condition for preventing a short circuit between the switching elements.

The phase component θt during the overlap period satisfies $\pi/2n > \theta t$, thereby preventing the short circuit between the two switching elements, being opposed upside and downside of DC power within the inverter bridge configuration. In the case where the multiphase inverter is a three-phase inverter, the condition which the phase component θt of the overlap period is required to satisfy is $\pi/6 > \theta t$.

As a condition for reducing the forward current to zero, the forward current flowing into the switching element at the commutation source during the overlap period, it is assumed that sin(θt)>(phase current of the multiphase inverter/a maximum peak value of the resonant current).

By satisfying this condition, it is possible to reduce the forward current flowing in the switching element at the commutation source during the overlap period.

According to the condition; sin(θt)>(phase current of the multiphase inverter/the maximum peak value of the resonant current), the maximum peak value of the resonant current in the resonant circuit is set to be larger than a phase current value of each phase in the multiphase inverter.

[Aspect of the Method For Controlling the Current Source Inverter]

The method for controlling the current source inverter according to the present invention is a method which converts DC power from the current source chopper into multiphase AC power, according to the operation of multiple switching elements held in the multiphase inverter. Upon commutation between the switching elements in the multiphase inverter, timing for driving the switching element at the commutation target and the switching element at the commutation source is controlled, thereby generating an overlap period during when both the switching element at the commutation target and the switching element at the commutation source are set to be the ON state, and controlling the resonant current.

During the overlap period, the resonant current in the resonant circuit is supplied to the switching element at the commutation source in the reverse biased direction, and the freewheeling diode being connected to this switching element in inverse-parallel is supplied with the resonant current in the forward biased direction. According to this current supply, zero current and the zero voltage are achieved during the overlap period in the switching element at the commutation source, and the commutation operation is performed under the condition of the zero current and zero voltage, at the point when the switching element at the commutation source is switched from the ON state to the OFF state.

The multiphase inverter is provided with a bridge configuration of the switching elements, and the resonant circuit is connected to inter-connection terminals of the switching elements being opposed in the bridge configuration. Upon commutation between the switching elements, current to the switching element at the commutation target is introduced to the resonant circuit so as to generate resonant current, and during the overlap period, the resonant current being generated is supplied to the switching element at the commutation source in the reverse biased direction thereof.

In the case where the multiphase inverter is an inverter which converts DC power into n-phase AC power, a condition to be satisfied by the phase component θt of the overlap period in order to prevent a short circuit between the switching elements is $\pi/2n > \theta t$. In the case where the multiphase inverter is a three-phase inverter circuit, the condition to be satisfied by the phase component θt of the overlap period is $\pi/6 > \theta t$.

The condition for reducing the forward current flowing in the switching element at the commutation source to zero, during the overlap period, is as the following; sin(θt)>(phase current of the multiphase inverter/the maximum peak value of the resonant current).

By satisfying this condition, it is possible to reduce the forward current flowing in the switching element at the commutation source to be zero during the overlap period.

According to the condition of sin(θt)>(phase current of the multiphase inverter/the maximum peak value of the resonant current), the maximum peak value of the resonant current in the resonant circuit is set to be larger than the phase current value of each phase in the multiphase inverter.

Effect of the Invention

As described above, according to the current source inverter and the method for controlling the current source inverter of the present invention, it is possible to prevent a switching loss by a normal switching operation for the commutation operation, without requiring any particular additional control, in the control of the switching elements of the current source inverter.

BRIEF DESCRIPTION OF DRAWINGS

FIG. 3A-3D illustrate schematic block diagrams and operation diagrams of the current source inverter according to the present invention;

FIG. 4A-4H are timing charts for explaining a commutation state of the switching elements in the current source inverter according to the present invention;

Figure 8A:
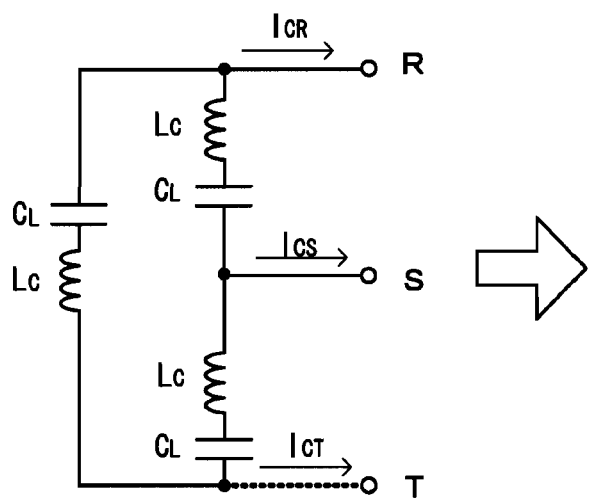
Figure 8B:
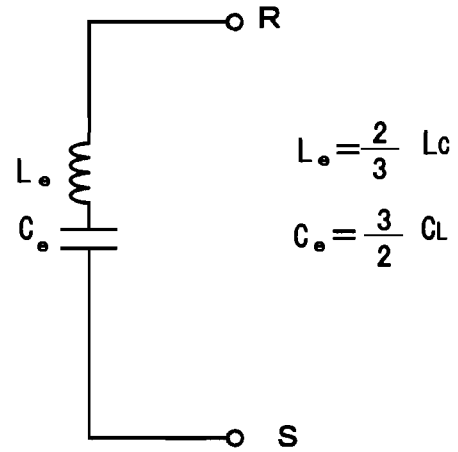
Figure 11:
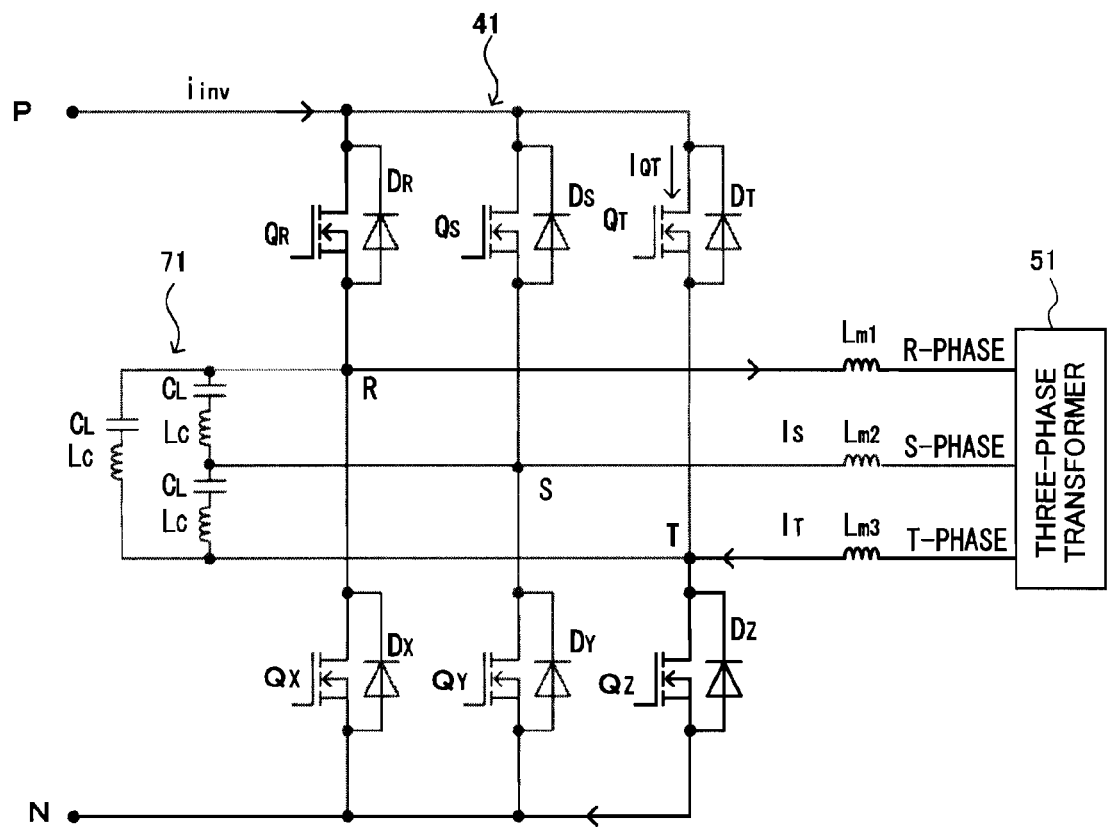
Figure 12:
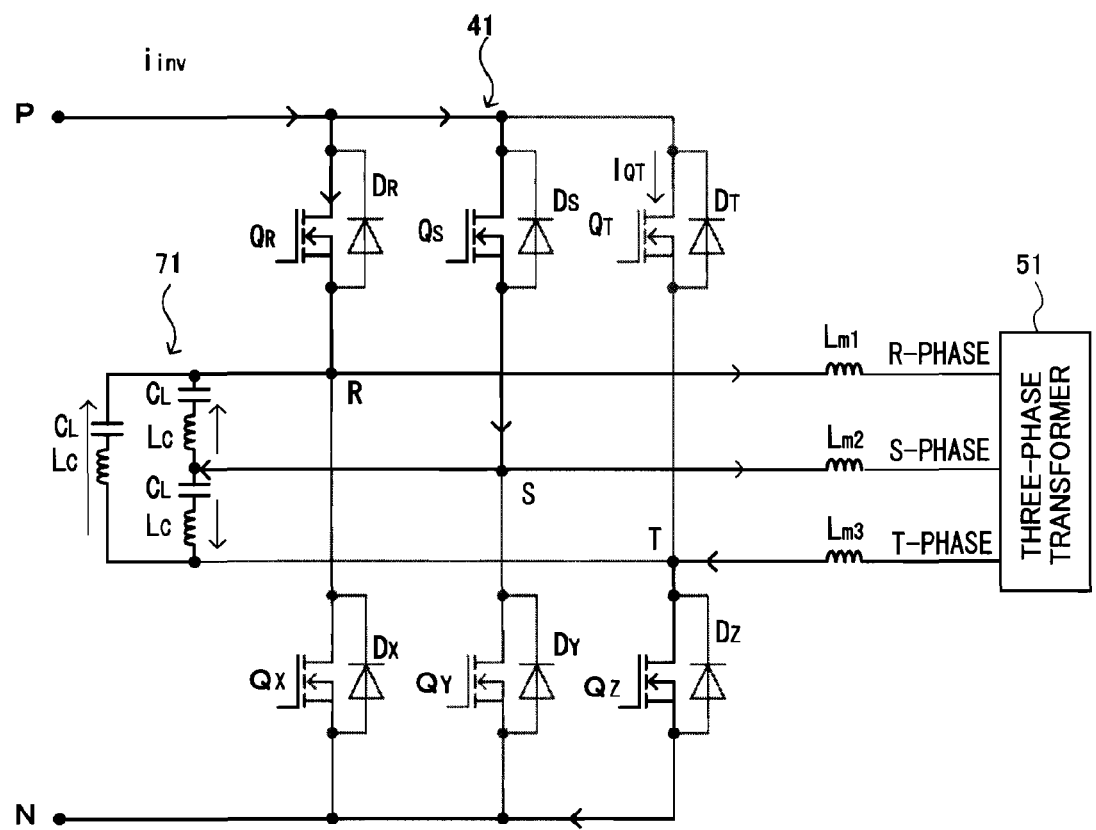
Figure 13:
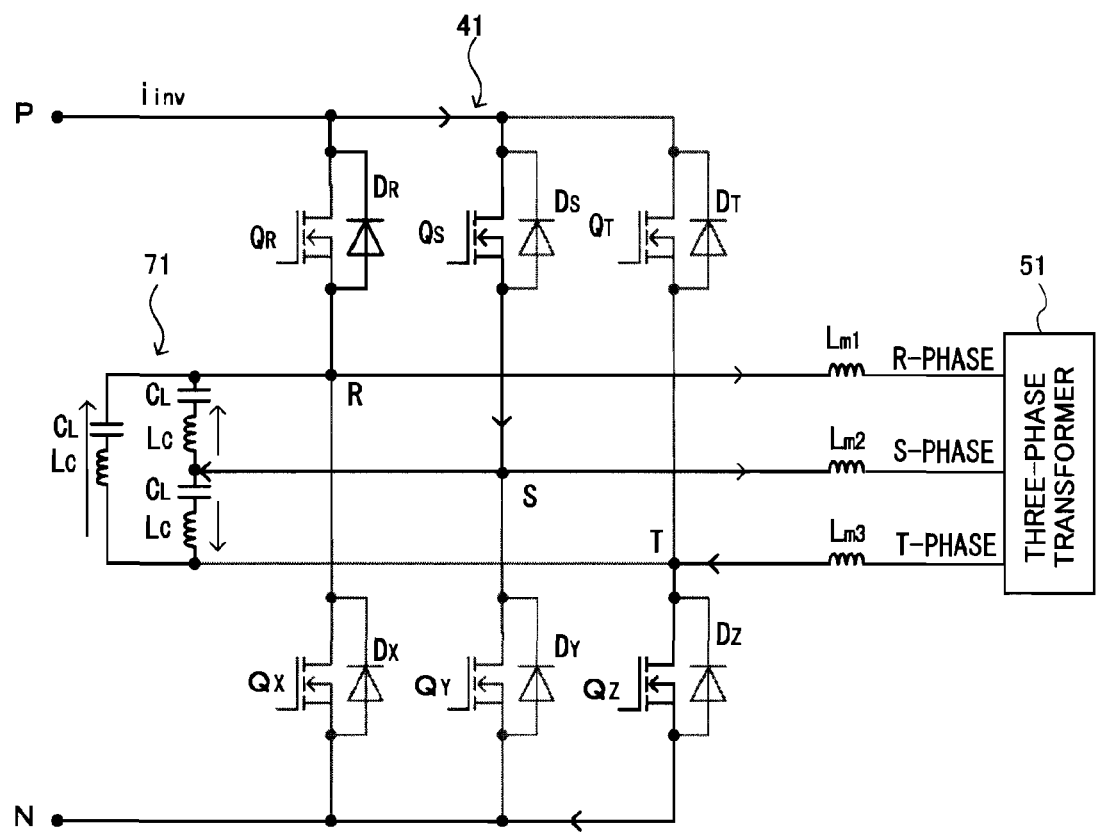
Figure 14:
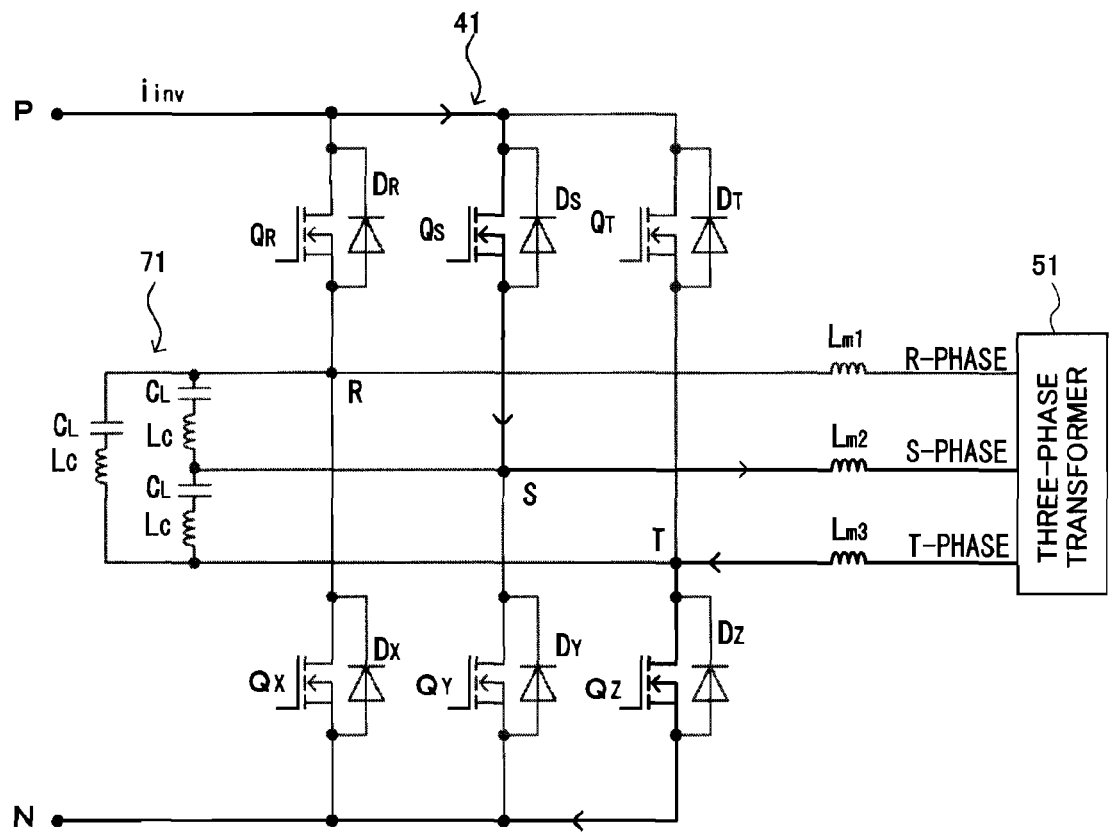
Figure 15:
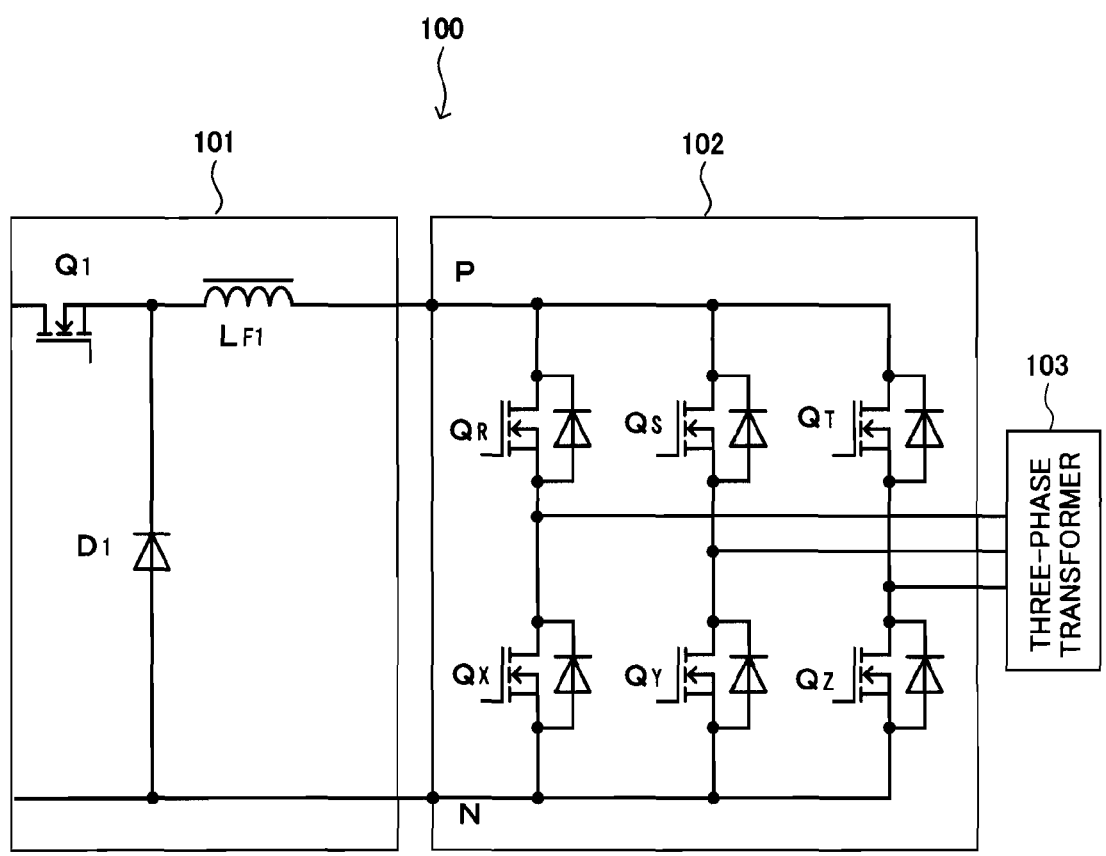

5A and 5B illustrate a configuration example of the inverter circuit and the resonant circuit according to the present invention;

FIG. 6A-6F are timing charts for explaining a drive of the switching elements according to the present invention;

FIG. 7A-7C illustrate the resonant current according to the present invention;

FIG. 8A and 8B illustrate the resonant circuit according to the present invention;

FIG. 9A-9H illustrate the overlap period and conditions of the resonant circuit according to the present invention;

FIG. 10A-10I illustrate the commutation state of the switching elements according to the present invention;

FIG. 11 illustrates the operation of the inverter circuit and the resonant circuit according to the present invention;

FIG. 12 illustrates the operation of the inverter circuit and the resonant circuit according to the present invention;

FIG. 13 illustrates the operation of the inverter circuit and the resonant circuit according to the present invention;

FIG. 14 illustrates the operation of the inverter circuit and the resonant circuit according to the present invention;

FIG. 15 illustrates one configuration of the current source inverter;

FIG. 16A-16E illustrate a switching loss at the time of commutation in the inverter; and FIG. 17A-17E illustrate a switching loss at the time of commutation in the inverter.

BEST MODE FOR CARRYING OUT THE INVENTION

Figure 1:
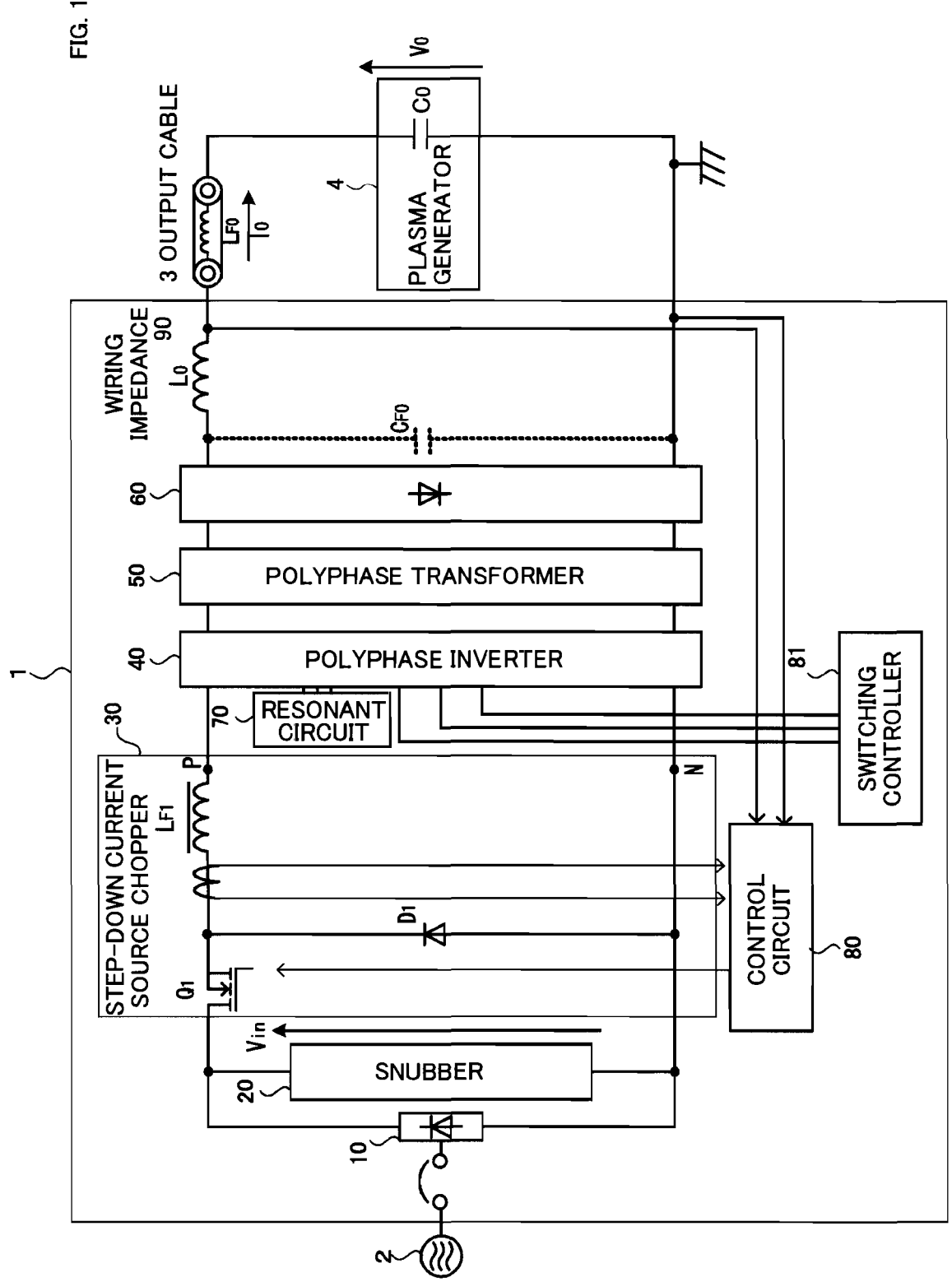
FIG. 1 illustrates a configuration example of the current source inverter according to the present invention.
Figure 2:
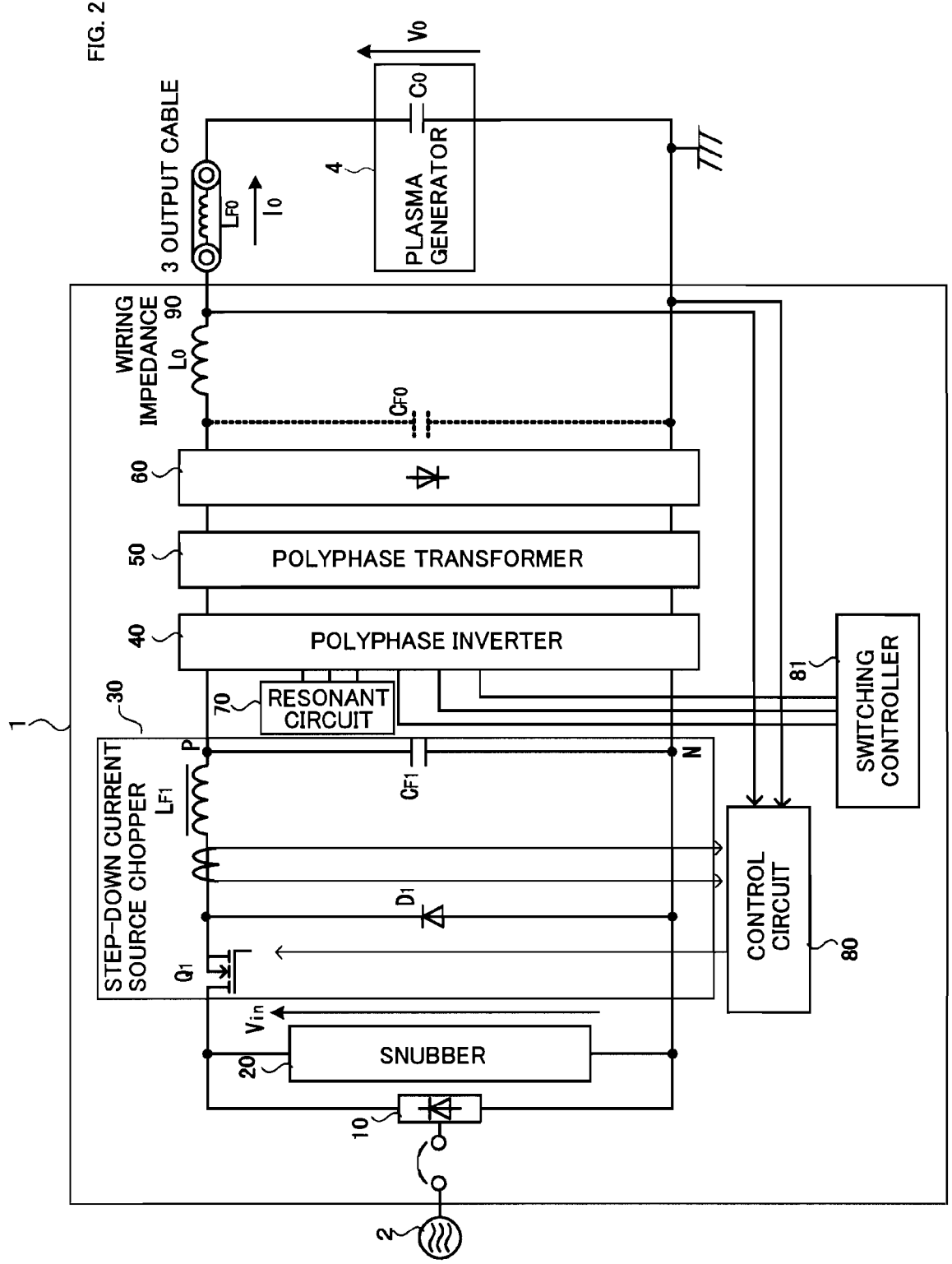
FIG. 2 illustrates another configuration example of the current source inverter according to the present invention.

Hereinafter, embodiments of the present invention will be explained in detail with reference to the accompanying drawings. In the following, for explaining the current source inverter and the method for controlling the current source inverter according to the present invention, FIG. 1 and FIG. 2 are used to illustrate the configuration example of the current source inverter, and FIG. 3 and FIG. 4 are used to illustrate the control example of the current source inverter. With reference to FIG. 5 to FIG. 13, the inverter circuit and the resonant circuit according to the present invention will be explained. Here, a three-phase inverter is illustrated as an example of the multiphase inverter.

[Configuration Example of the Current Source Inverter]

Firstly, with reference to FIG. 1 and FIG. 2, a configuration example of the current source inverter according to the present invention will be explained.

The current source inverter 1 of the present invention as shown FIG. 1 is provided with a rectifier 10 for rectifying AC power of an AC source 2, a snubber 20 for constituting a protection circuit which suppresses high voltage generated transiently, a current source step-down type chopper 30 for converting voltage of DC power inputted from the rectifier 10 into a predetermined voltage to output DC power, a multiphase inverter 40 for converting the DC output from the current source step-down type chopper 30 into multiphase AC output, a multiphase transformer 50 for converting the AC output from the multiphase inverter 40 into a predetermined voltage, and a multiphase rectifier 60 for converting the AC from the multiphase transformer 50 into DC.

A step-down and -up type chopper may be employed as the chopper for carrying out the DC-AC conversion, instead of the aforementioned current source step-down type chopper 30.

The current source step-down type chopper 30 is provided with a switching element $Q_1$, a diode $D_1$, and a DC reactor $L_{F1}$. The switching element $Q_1$ performs chopper control on the DC voltage having been rectified by the rectifier 10, thereby accomplishing step-down of voltage. The DC reactor $L_{F1}$ subjects the DC after the chopper control is performed to current smoothing, and inputs the smoothed current into the multiphase inverter 40.

The control circuit 80 inputs chopper current of the current source step-down type chopper 30 and a detection value of the output voltage from the current source inverter 1, and performs the chopper control on the switching element $Q_1$ so that the inputted current and the output voltage become a predetermined current and a predetermined output voltage, respectively.

FIG. 2 shows an example of the current source inverter 1 according to the present invention, where another configuration example of the current source step-down type chopper 30 is included. The current source step-down type chopper 30 as shown in FIG. 2 has a configuration that an output capacitor $C_{F1}$ is connected in parallel to the output end.

In the configuration as shown in FIG. 2, the output capacitor is installed, which is not usually provided in the current source step-down type chopper. With the configuration that the output capacitor $C_{F1}$ is connected to the output end of the current source step-down type chopper 30, the output capacitor absorbs a surge voltage generated when commutation operation is performed between the switching elements in the multiphase inverter 40, and energy of the inductance connected in series with each switching element, thereby achieving protection of the switching elements.

It is to be noted that a value of the output capacitor $C_{F1}$ is set to such an extent that a delay of the current does not have an impact on the commutation of the inverter operation, according to a time constant of this output capacitor and wiring inductance.

The multiphase inverter 40 is provided with a multiphase inverter circuit which is made up of a bridge connection of switching elements, the number of which is associated with the number of phases. By way of example, in the case of three phases, the three-phase inverter circuit is made up of six switching elements. As the switching element, for instance, a semiconductor switching element such as IGBT and MOS-FET may be employed. Each switching element of the inverter circuit performs switching operation based on a control signal from the switching controller 81, and converts DC power into AC power to output the AC power.

The multiphase inverter 40 is provided with a resonant circuit 70, and introduces the resonant current generated in the resonant circuit 70 into the switching elements in the commutation state in the multiphase inverter circuit, and performs commutation between those switching elements under the condition of zero current and zero voltage. The resonant circuit 70 of the present invention generates the resonant current in sync with the commutation operation of each switching element in the multiphase inverter circuit, introduces the resonant current into the switching element at the commutation source, and performs the commutation operation of the switching element at the commutation source according to ZCS (zero current switching) and ZVS (zero voltage switching).

The AC output from the multiphase inverter 40 is allowed to become high frequency output by increasing switching frequency of the switching element. When a plasma generator serves as a load, the current source inverter, for instance, supplies high-frequency output of 200 KHz to the load. In order to obtain high-frequency output, the multiphase inverter circuit performs switching operation of the switching element at high frequency. As thus described, when the switching element is switched at a high drive frequency, the AC output includes a high-frequency ripple component.

The multiphase rectifier 60 is provided with a DC filter circuit on the output part, similar to a normal multiphase rectifier circuit, as one configuration example for removing the high-frequency ripple component included in the AC output from the multiphase inverter 40. The DC filter circuit may be made up of an output capacitor $C_{FO}$ connected in parallel to the output end, and an output reactor $L_{FO}$ connected in series therewith.

The current source inverter 1 may be configured in such a manner as outputting DC output from the multiphase rectifier 60, via wiring inductance $L_O$ provided in the wiring, without the aforementioned DC filter circuit, and connecting the current source inverter 1 with the plasma generator 4 being a plasma load via the output cable 3, thereby allowing a use of parasitic impedance of the current source inverter as a configuration for removing the high-frequency ripple component.

By way of example, inductance held by the wiring impedance 90 between the multiphase rectifier 60 and the output terminal, inductance $L_{FO}$ included in the output cable connected between the current source inverter 1 and the load, and electrode capacity $C_0$ of the plasma generator 4 in the case of plasma load, may constitute a filter circuit for removing the high frequency component, similar to the DC filter circuit, thereby reducing the high-frequency ripple component.

In the case where the current source inverter is assumed as a power supply source for the plasma generator, when an arc is generated in the plasma generator 4 on the load side, it is possible to assume that the load is short-circuited, and arc energy $P_c$ is supplied from the output capacitor $C_{FO}$ of the DC filter circuit which is provided on the current source inverter side.

On this occasion, the arc energy $P_C$ outputted from the output capacitor $C_{FO}$ may be expressed by the following formula (1):

$$P_C = \tfrac{1}{2} \times C_{FO} \times V_0^2 + \tfrac{1}{2} \times (L_{FO} + L_O) \times I_O^2 \tag{1}$$

It is preferable that the arc energy $P_C$ of the plasma generator 4 is equal to or less than 1 mJ per 1 kW power output. Usually, the inductance $L_{FO}$ and $L_O$ indicate small values, and therefore, the energy $(L_{FO}+L_O) \times I_O^2$ of the inductance $L_{FO}$ and $L_O$ may be ignored relative to 1 mJ/kW. It is to be noted that 1 mJ/kW represents energy in the unit of mJ per 1 kW of output power, and the energy for the output power 100 kW corresponds to 100 mJ. Therefore, in the case where the arc energy $P_C$ of the plasma generator 4 is equal to or less than 1 mJ, a value equal to or more than the $C_{FO}$ value obtained by assuming $P_C$ in the formula (1) as 1 mJ, is selected as a value of the output capacitor $C_{FO}$, thereby preventing an impact on the arc energy $P_C$.

Therefore, if the current source inverter has a configuration which utilizes the wiring impedance or the parasitic impedance of the output cable or of the electrode capacity of the plasma generator, instead of the DC filter circuit, it is possible to remove the high-frequency ripple component and supply the arc energy $P_C$, as far as the capacity corresponding to the output capacity $C_{FO}$ is large enough for supplying the arc energy $P_C$.

In addition, the high-frequency ripple component possesses a property to increase, when the drive frequency of the multiphase inverter circuit is decreased. Therefore, by increasing the drive frequency of the multiphase inverter circuit, it is possible to reduce the necessity of the output capacitor $C_{FO}$ and the output reactor $L_{FO}$. In addition, increase of the drive frequency of the multiphase inverter circuit may cause suppression on the energy held inside the current source inverter 1.

[Operation Example of Commutation in the Current Source Inverter]

Next, with reference to FIG. 3 and FIG. 4, an example of commutation operation in the current source inverter according to the present invention will be explained, taking a three-phase inverter as an example.

FIG. 3 illustrates schematic block diagrams and operation diagrams of the current source inverter, and FIG. 4 is a timing chart for explaining a commutation state of the switching elements in the current source inverter. It is to be noted that in FIG. 3, the state of current flow through the elements and the wiring is represented by light and dark in color, and a conduction state is illustrated being dark in color, and a non-conduction state is illustrated being light in color.

The current source inverter shown in FIG. 3 is made up of a bridge connection of six switching elements $Q_R$, $Q_S$, $Q_T$, $Q_X$, $Q_Y$, and $Q_Z$, the switching element $Q_R$ and the switching element $Q_Y$ are connected in series, the switching element $Q_S$ and the switching element $Q_Y$ are connected in series, and the switching element $Q_T$ and the switching element $Q_Z$ are connected in series.

The connection point between the switching element $Q_R$ and the switching element $Q_X$ is connected as an R-phase component of the three-phase transformer 51 via the inductance $L_{m1}$, the connection point between the switching element $Q_S$ and the switching element $Q_Y$ is connected as an S-phase component of the three-phase transformer 51 via the inductance $L_{m\ 2}$, and the connection point between the switching element $Q_T$ and the switching element $Q_Z$ is connected as a T-phase component of the three-phase transformer 51 via the inductance $L_{m3}$.

In addition, the connection point between the switching element $Q_R$ and the switching element $Q_X$, the connection point between the switching element $Q_s$ and the switching element $Q_Y$, and the connection point between the switching element $Q_T$ and the switching element $Q_Z$ are respectively connected to the terminals of the resonant circuit, and resonant current is supplied from the resonant circuit.

The timing chart as shown in FIG. 4 illustrates an example of the commutation operation between the switching element $Q_R$ and the switching element $Q_S$. Here, the switching element $Q_R$ is assumed as the switching element at the commutation source, and the switching element $Q_S$ is assumed as the switching element at the commutation target.

In the current source inverter according to the present invention, the commutation operation is controlled so that an overlap period is generated during when both the switching element at the commutation source and the switching element at the commutation target are set to be the ON state, and the resonant current of the resonant circuit is controlled in sync with this commutation operation, thereby supplying the resonant current to the switching element at the commutation source.

The overlap period during when both the switching element $Q_R$ at the commutation source and the switching element $Q_S$ at the commutation target are set to be the ON state is generated, by setting the timing for rising edge of a gate pulse signal $G_S$ (FIG. 4B) of the switching element $Q_S$, to be prior to the falling edge of the gate pulse signal $G_R$ (FIG. 4A) of the switching element $Q_R$, whereby the gate pulse signal $G_R$ which sets the switching element $Q_R$ to be the ON state and the gate pulse signal $G_S$ (FIG. 4B) which sets the switching element $Q_S$ to be the ON state are allowed to overlap one another in time wise. Therefore, the switching element $Q_S$ is set to be the ON state before the switching element $Q_R$ is switched from the ON state to the OFF state, and during the overlap period, both the switching element $Q_R$ and the switching element $Q_S$ are set to be the ON state.

Hereinafter, an explanation will be made as to each of the periods in FIG. 4; Period A, Period B, period C, and Period D.
(Period A):
During the period A in FIG. 4, the switching element $Q_R$ is in the ON state, and current $I_{QR}$ (FIG. 4C) flows in the switching element $Q_R$, and the current $I_{QS}$ (FIG. 4D) of the switching element $Q_S$ does not flow.

FIG. 3A illustrates an operating state and a current state of the switching elements during the period A. The current $I_{QR}$ (FIG. 4C) of the switching element $Q_R$ is supplied to the three-phase transformer 51 as primary current in R phase $I_R$ (FIG. 4H), and returns via the switching element $Q_Z$.
(Period B):
The gate pulse signal $G_S$ sets the switching element $Q_S$ to be the ON state, and the current $I_{QS}$ (FIG. 4D) starts to flow in the switching element $Q_S$. On this occasion, the current $I_{QS}$ of the switching element $Q_S$ increases by the time constant according to the resonance circuit 70, inductance $L_{m1}$, and inductance $L_{m2}$, and therefore, at the time when the switching element $Q_S$ is turned to be the ON state, ZCS (zero current switching) is performed (FIG. 4D).

In sync with the rising edge of the switching element $Q_S$, resonant current starts flowing into the resonant circuit 70 (FIG. 4G). The resonant current flows in the reverse biased direction to the switching element $Q_R$. Since this resonant current is inversely directed relative to the forward current $I_{QR}$ in the switching element $Q_R$, the resonant current cancels the current $I_{QR}$ and decreases the current (FIG. 4C). The number 1 each enclosed within a circle in FIG. 4C and FIG. 4G indicates current components in the relationship canceling each other.

FIG. 3B illustrates the operating state and the current state of the switching elements during the period B. The forward current of the switching element $Q_R$ is canceled by the resonant current, and the primary current $I_R$ (FIG. 4H) according to a part of the resonant current and the primary current $I_S$ (FIG. 4H) according to the switching element $Q_S$ are supplied to the three-phase transformer 51, and return via the switching element $Q_Z$.
(Period C):
At the end point of the period B, the current $I_{QR}$ of the switching element $I_{QR}$ (FIG. 4C) is canceled by the resonant current (FIG. 4G) and becomes zero current. A surplus of the resonant current starts flowing in the form of diode current $I_{DR}$ (FIG. 4E) into the freewheeling diode $D_R$ which is connected in parallel to the switching element $Q_R$. The number 2 each enclosed within a circle in FIG. 4E and FIG. 4G indicates current components in the relationship being associated with each other.

During an initial part of the period C following the period B, both the switching element $Q_R$ and the switching element $Q_S$ are in the ON state. During this period, the current $I_{QR}$ (FIG. 4C) of the switching element $Q_R$ is continued to be canceled by the resonant current (FIG. 4G) to keep zero current, and the current $I_{QS}$ (FIG. 4D) of the switching element $Q_S$ increases along with the increase of the resonant current. Accordingly, a drain-to-source voltage $V_{D-S}$ of the switching element $Q_R$ is kept to be zero voltage (FIG. 4F).

During the period C, when the switching element $Q_R$ at the commutation source is set to be the OFF state at the falling edge of the gate pulse signal $G_R$, the switching element $Q_S$ is in the ON state and the switching element $Q_R$ is in the OFF state, and accordingly establishing the ON state and OFF state being different from each other. Under this condition, the switching element $Q_R$ is set to be the OFF state, and stops the flow of the current $I_{QR}$, together with stopping the canceling by the resonant current. However, the resonant current continues to flow in the freewheeling diode $D_R$.

Therefore, the current $I_{QR}$ flowing in the switching element $Q_R$ is kept to be in the zero current state after the switching element $Q_R$ at the commutation source becomes the OFF state, in succession to the zero current state established by the resonant current, whereby the switching element $Q_R$ at the commutation source achieves ZCS (zero current switching).

In addition, the resonant current flows into the freewheeling diode $D_R$ of the switching element $Q_R$, whereby the switching element $Q_R$ at the commutation source achieves ZVS (zero voltage switching). This period C ends at the point when the resonant current becomes zero.

FIG. 3C illustrates the operating state and the current state of the switching elements during the period C. The resonant current cancels the forward current of the switching element $Q_R$ to establish zero current, and flows into the freewheeling diode $D_R$ to establish zero voltage. The primary current $I_R$ according to a part of the resonant current, and the primary current $I_S$ according to the switching element $Q_S$ are supplied to the three-phase transformer 51, and return via the switching element $Q_Z$ (FIG. 4H).

(Period D):

At the point when the resonant current becomes zero, a DC voltage component is applied on the drain-to-source voltage $V_{QR}$ of the switching element $Q_R$ (FIG. 4F).

In the operating state as shown in FIG. 3 and FIG. 4, there are flows of the primary current in R phase $I_R$ and the primary current in S phase $I_S$ between the switching elements and the three-phase transformer 51. During the period A, the current $I_{QR}$ flows as the primary current $I_R$, and after commutating from the primary current $I_R$ to the primary current $I_S$ during the periods B and C, the current $I_{QS}$ flows as the primary current $I_S$ during the period D.

In the commutation, during the period when both the primary current $I_R$ and the primary current $I_S$ flow together, the primary current $I_R$ has the same current value as the primary current $I_S$, being half relative to the current when either one primary current flows. The period during when both the primary current $I_R$ and the primary current $I_S$ flow together corresponds to the period C in FIG. 4H, excluding a part when the period C is switched to the period D.

During the period B in FIG. 4H, the primary current $I_R$ decreases toward the intermediate current, and the primary current $I_S$ increases toward the intermediate current. Further at the part for switching to the period D in the period C in FIG. 4H, the primary current $I_R$ decreases toward zero current from the intermediate current, and the primary current $I_S$ increases from the intermediate current to the total primary current. According to the aforementioned switching operation from the current $I_{QR}$ to the current $I_{QS}$, the primary current is kept to be supplied without interruption, from the current source step-down type chopper to the three-phase transformer 51.

FIG. 3D illustrates the operating state and the current state of the switching elements during the D period. The resonant current stops, and the primary current $I_S$ according to the switching element $Q_S$ is supplied to the three-phase transformer 51, and returns via the switching element $Q_Z$.

According to the aforementioned commutation operation, the resonant current from the resonant circuit is supplied to the switching element at the commutation source in the reverse biased direction, during the overlap period, and the resonant current is also supplied to the freewheeling diode in the forward biased direction, the diode being connected with the switching element in inverse-parallel, thereby establishing zero current and zero voltage in the switching element at the commutation source during the overlap period, and the commutation operation is performed under the condition of zero current and zero voltage at the point when the switching element at the commutation source is switched from the ON state to the OFF state.

Next, an aspect of the current source inverter and the method for controlling the current source inverter according to the present invention will be explained.

Figure 5A:
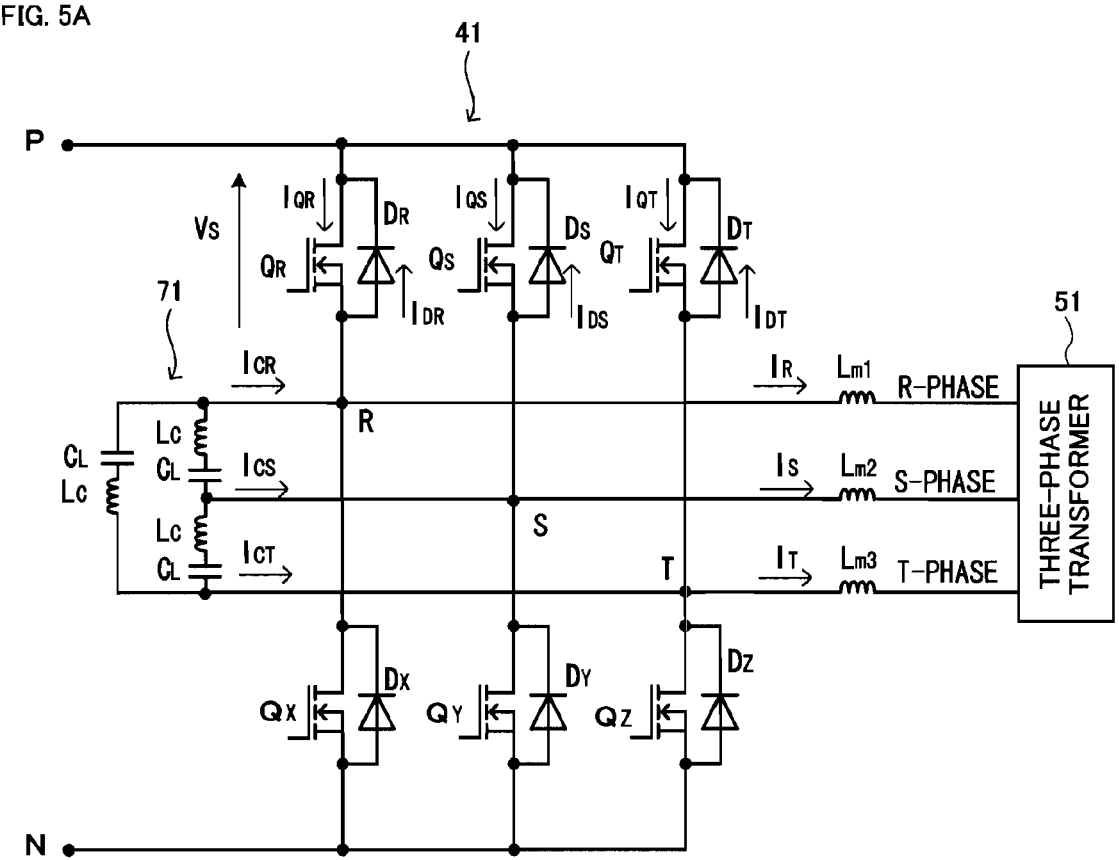
Figure 5B:
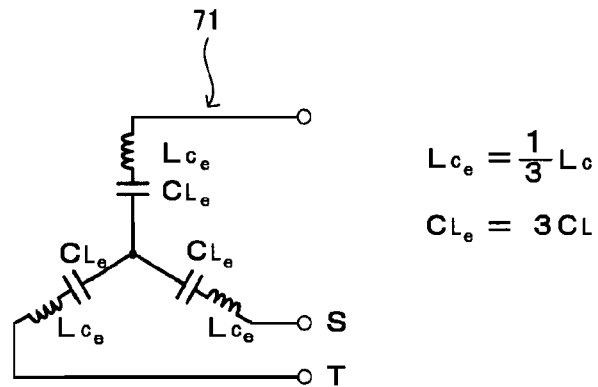
Figure 6:
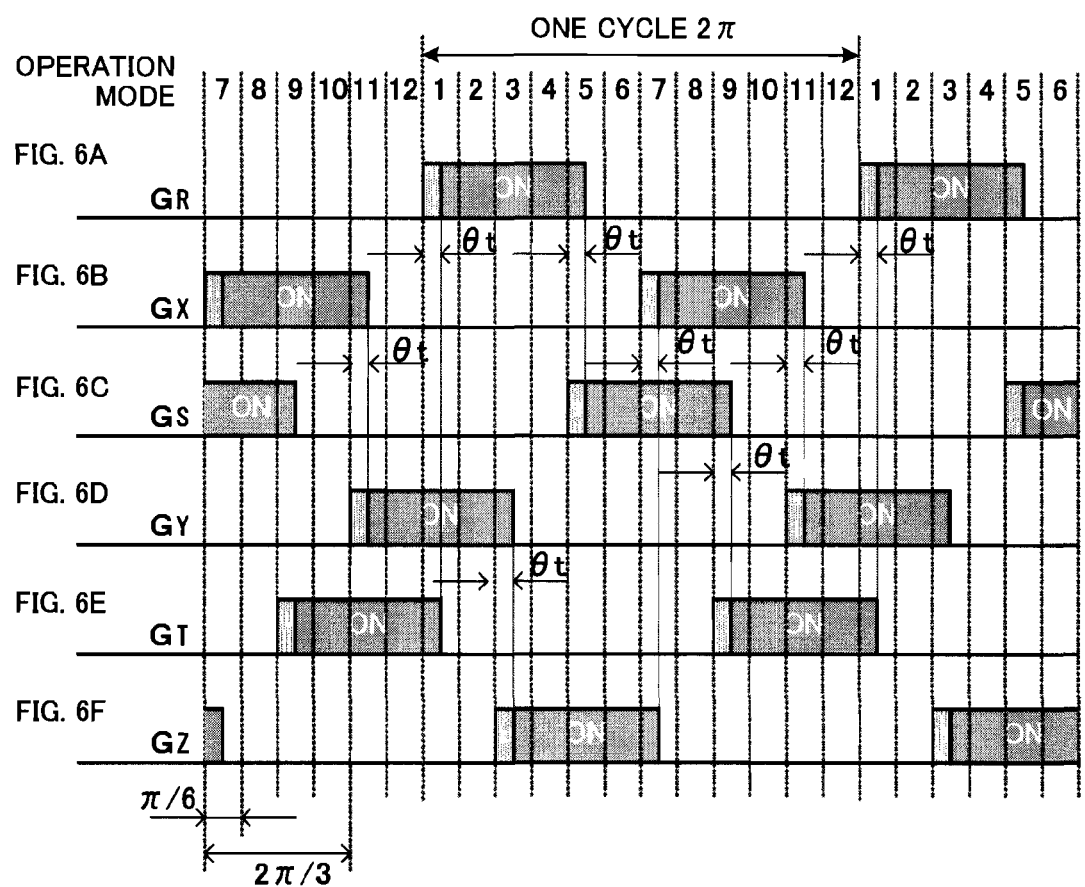

With reference to FIG. 5 to FIG. 11, the aspect of the current source inverter and the method for controlling the current source inverter according to the present invention will be explained. FIG. 5 illustrates a configuration example of the inverter circuit and the resonant circuit according to the present invention, FIG. 6 is a timing chart for explaining a driving of the switching elements in the inverter circuit according to the present invention, FIG. 7 illustrates the resonant current of the resonant circuit according to the present invention, FIG. 8 illustrates the resonant circuit according to the present invention, FIG. 9 illustrates conditions for the overlap period in the inverter control and the resonant circuit according to the present invention, FIG. 10 illustrates the commutation state of the switching elements in the inverter circuit according to the present invention, and FIG. 11 to FIG. 14 illustrate operations of the inverter control according to the present invention. It is to be noted that in FIG. 11 to FIG. 14, the state of current flow through the elements and the wiring is represented by light and dark in color, and a conduction state is illustrated being dark in color, and a non-conduction state is illustrated being light in color.

The resonant circuit according to the present invention is provided with LC series circuits respectively between the terminals being formed by the current feed ends of the resonant circuit. Each LC series circuit inputs forward current from the switching element at the commutation target, upon commutation between the switching elements in the inverter circuit, generates resonant current, and supplies the resonant current thus generated to the switching element at the commutation source in the reverse biased direction thereof.

The inverter circuit 41 as shown in FIG. 5A is made up of a bridge connection of six switching elements $Q_R$, $Q_S$, $Q_T$, $Q_X$, $Q_Y$, and $Q_Z$, and the switching element $Q_R$ and the switching element $Q_X$ are connected in series, the switching element $Q_S$ and the switching element $Q_Y$ are connected in series, and the switching element $Q_T$ and the switching element $Q_Z$ are connected in series.

The connection point R between the switching element $Q_R$ and the switching element $Q_X$ is connected via the inductance $L_{m1}$, as the R-phase component of the three-phase transformer 51, the connection point S between the switching element $Q_S$ and the switching element $Q_Y$ is connected via the inductance $L_{m2}$, as the S-phase component of the three-phase transformer 51, and the connection point T between the switching element $Q_T$ and the switching element $Q_Z$ is connected via the inductance $L_{m2}$, as the T-phase component of the three-phase transformer 51.

The resonant circuit 71 is provided with three units of resonant circuit, made up of serial connections of the capacitor $C_L$ and the reactance $L_C$, and respective ends of the three units of the resonant circuit are connected to between the terminals of three current supply ends. The terminals of the current supply ends are respectively connected to the connection point R between the switching element $Q_R$ and the switching element $Q_X$, the connection point S between the switching element $Q_S$ and the switching element $Q_Y$, and the connection point T between the switching element $Q_T$ and the switching element $Q_Z$.

With this configuration, upon commutation between the switching element $Q_R$ and the switching element $Q_S$, current $I_{CS}$ is supplied from the connection point S to the resonant circuit 71, and upon commutation between the switching element $Q_S$ and the switching element $Q_T$, current $I_{CT}$ is supplied from the connection point T to the resonant circuit 71, and upon commutation between the switching element $Q_T$ and the switching element $Q_R$, current $I_{CR}$ is supplied from the connection point R to the resonant circuit 71.

The resonant circuit 71 inputs forward current of the switching element at the commutation target out of two switching elements for performing the commutation operation, so as to generate resonant current. In addition, the resonant circuit 71 supplies in the reverse biased direction, thus generated resonant current to the switching element at the commutation source out of the two switching elements which perform the commutation operation. By way of example, upon commutation between the switching element $Q_R$ and the switching element $Q_S$, the resonant circuit 71 inputs the forward current of the switching element $Q_S$ at the commutation target to generate resonant current, and supplies thus generated resonant current to the switching element $Q_R$ at the commutation source in the reverse biased direction. In FIG. 5A, the resonant circuit 71 is illustrated as a configuration having a delta connection, but it may be configured as a star connection as shown in FIG. 5B.

The timing chart as shown in FIG. 6 for explaining the driving of the switching elements in the inverter circuit according to the present invention, illustrates gate pulse signals for driving the switching elements $Q_R$, $Q_S$, $Q_T$, $Q_X$, $Q_Y$, and $Q_Z$. Since the three-phase inverter is taken as an example here, when one cycle of drive angular frequency $\omega_I$ of the three-phase inverter is assumed as a phase component of $2\pi$, the period when the switching element is set to be the ON state in each phase corresponds to a phase component of $(2\pi/3)$. FIG. 6 illustrates one cycle being divided into 12 periods in total, assuming a phase component of $\pi/6$ as one period. It is to be noted that when a drive frequency of the three-phase inverter is assumed as $f_I$, the drive angular frequency $\omega_I$ is represented by $\omega_I = 2\pi \times f_I$.

In the present invention, an overlap period $\theta t$ is provided between two switching elements in the relationship of commutation with each other, for generating resonant current in the resonant circuit, then supplying thus generated resonant current to the switching element at the commutation source, allowing the switching element at the commutation source to perform the commutation operation according to ZCS (zero current switching) and ZVS (zero voltage switching), and then reducing a switching loss at the time of commutation.

(Setting of the Overlap Period $\theta t$ and the Resonant Circuit)

Hereinafter, an explanation will be made as to the overlap period $\theta t$ which is necessary for the commutation operation according to ZCS (zero current switching) and ZVS (zero voltage switching).

FIG. 7 illustrates a relationship between the resonant current $I_{CL}$ for the primary current in R phase $I_R$ and the overlap period $\theta t$. FIG. 7A illustrates the primary current in R phase $I_R$ and the resonant current $I_{CL}$, FIG. 7B illustrates a gate pulse signal $G_R$ for the drive control of the switching element $Q_R$, and FIG. 7C illustrates a gate pulse signal $G_S$ for the drive control of the switching element $Q_S$. In addition, FIG. 8 illustrates a configuration example of the resonant circuit.

In the overlap period $\theta t$ during the commutation, the resonant current $I_{CL}$ generated by the resonant circuit made up of the capacitor $C_L$ and the reactor $L_C$ being connected in series is expressed by the following formula (2), when equivalent capacitance $C_e$ and equivalent reactor $L_e$ are used;

$$I_{CL} = I_{max} \times \sin\omega_n t \tag{2}$$

Here, the maximum value $I_{max}$ of the resonant current and angular frequency $\omega_n$ are expressed respectively by the following formulas (3) and (4):

$$I_{max} = V_{RS}/(L_e/C_e)^{1/2} \tag{3}$$

$$\omega_n = 1/(L_e \times C_e)^{1/2} \tag{4}$$

It is to be noted that $V_{RS}$, $L_e$, and $C_e$ respectively represent the voltage, equivalent reactor, equivalent capacitance between the terminal R and the terminal S of the resonant circuit as shown in FIG. 8A. FIG. 8B illustrates an equivalent circuit of the resonant circuit when commutation is performed from R phase to S phase. On this occasion, since the $I_{CT}$ current of the T-phase does not flow, it is possible to treat the $L_e$ and $C_e$ as a join impedance circuit viewed from between the phase R and the phase S.

The equivalent reactor $L_e$ and the equivalent capacitance $C_e$ are expressed by the following formulas (5) and (6):

$$L_e = 2/3 \times L_C \tag{5}$$

$$C_e = 3/2 \times C_L \tag{6}$$

As expressed by the formulas (4) to (6), the angular frequency $\omega_n$ of the resonant circuit is determined by the capacitor $C_L$ and the reactor $L_C$ of the resonant circuit, and the this angular frequency is specific to the resonant circuit.

In FIG. 7A, the time $t_p$ when the resonant current $I_{CL}$ becomes the maximum peak value $I_{max}$ is expressed by the following formula (7) according to the relationship $\omega_n \times t_p = \pi/2$:

$$t_p = \pi/2 \times 1/\omega_n = \pi/2 \times (L_C \times C_L)^{1/2} \tag{7}$$

Upon commutation of the switching element Q at the commutation source, current is conducted into the freewheeling diode D of the switching element Q, thereby rendering the drain-to-source voltage of the switching element to be zero voltage, and achieving ZVS (zero voltage switching). In order to supply current to the freewheeling diode D together with supplying the primary current $I_R$ component to the three-phase transformer, the capacitor $C_L$ and the reactor $L_C$ are selected in the resonant circuit, in such a manner that the maximum peak value $I_{max}$ of the resonant current $I_{CL}$ as expressed by the formula (3) falls into the ranges of $I_{max} > I_R$, $I_{max} > I_S$, $I_{max} > I_T$ in each phase.

In FIG. 7, the maximum range of the overlap period $\theta t$ corresponds to a half cycle component n of the resonant current. When the overlap period is set in such a manner as exceeding the half cycle $\pi$ of the resonant current, the resonant current has already attenuated to zero at the point of time when the overlap period $\theta t$ ends and the switching element at the commutation source is set to be the OFF state. Therefore, it is not possible to bring the freewheeling diode of the switching element at the commutation source to conduction to achieve the zero voltage state.

Therefore, in order to achieve the ZVS (zero voltage switching), the overlap period $\theta t$ is set to be within the half cycle n of the resonant current.

FIG. 9 illustrates conditions for setting the overlap period $\theta$, and the capacitor $C_L$ and the reactor $L_C$ of the resonant circuit. FIG. 9A and 9B illustrate the timing of the gate pulse signals of the switching elements $Q_R$ and $Q_X$ in a relationship being connected in the bridge configuration, FIG. 9C and 9D illustrate the timing of the gate pulse signals of the switching elements $Q_S$ and $Q_Y$ in a relationship being connected in the bridge configuration, and FIG. 9G and 9H illustrate the timing of the gate pulse signals of the switching elements $Q_T$ and $Q_Z$ in a relationship being connected in the bridge configuration. In addition, FIG. 9E illustrates the resonant current $I_{CL}$ of the resonant circuit which is connected between the switching element $Q_R$ and the switching element $Q_S$, and FIG. 9F illustrates the forward current $I_{QR}$ which flows in the switching element $Q_R$.

In the current source inverter according to the present invention, there are following conditions as described above for performing the commutation operation and the switching operations according to ZCS and ZVS:

(a) The maximum peak value $I_{max}$ of the resonant current $I_{CL}$ falls into the following ranges; $I_{max} > I_R$, $I_{max} > I_S$, $I_{max} > I_T$, in the respective phases; and (b) The maximum range of the overlap period θt corresponds to the half cycle component π of the resonant current.

There are conditions required for the overlap period and the resonant circuit, as the following (c), (d), and (e). FIG. 9 illustrates these conditions (c), (d), and (e) using the reference marks; A, B, and C, respectively.

(c) The condition necessary for preventing a short circuit between the switching elements in the relationship of connection in the bridge configuration is; π/3>θt.

When the overlap period θt becomes longer, there occurs a short circuit between the switching elements $Q_R$ and the switching element $Q_X$, and so on, being in the relationship of connection in the bridge configuration, as indicated by the reference mark A in FIG. 9. In order to prevent this short circuit between the switching elements, the condition of π/3>θt ($ω_I × T_n$) is obtained. It is to be noted that $T_n$ represents a time duration of the resonant current $I_{CL}$, and $ω_I$ represents the drive angular frequency of the three-phase inverter.

It is to be noted that if the overlap period is formed by extending the period both forwardly and backwardly, during when each switching element is set to be the ON state, by an arbitrary time duration being equal on both sides in time wise, a necessary condition is that each extended period is shorter than π/6.

(d) The condition necessary for preventing the resonant current $I_{CL}$ from relating to a mode for generating next resonant current is; $(L_C × C_L)^{1/2} < 1/(3ω_I)$. Here, $ω_I$ represents the drive angular frequency of the three-phase inverter circuit.

As indicated by the reference symbol B in FIG. 9, after the switching element $Q_S$ is set to be the ON state, the switching element $Q_X$ is set to be the ON state after the lapse of π/3, and next resonant current starts to flow. Therefore, the resonant current $I_{CL}$ which is generated by turning ON the switching element $Q_S$ is required to be terminated within π/3.

When the time duration of the resonant current $I_{CL}$ is assumed as $T_n$ and the drive angular frequency of the three-phase inverter is assumed as $ω_I$, the condition that the resonant current $I_{CL}$ ends within π/3 is expressed by $ω_I × T_n < π/3$.

On the other hand, since the time duration $T_n$ of the resonant current $I_{CL}$ in the resonant circuit corresponds to a half cycle π, there is a relationship of $T_n = π/ω_n$. It is to be noted that $ω_n$ represents the angular frequency of the resonant circuit.

Therefore, according to the relationship as described above, when the condition for the resonant current $I_{CL}$ to end within π/3; "$ω_I × T_n < π/3$" is expressed by the condition required for the capacitor $C_L$ and the reactor $L_C$ of the resonant circuit, it is expressed as $(L_C × C_L)^{1/2} < 1/(3ω_I)$.

(e) The condition for the current $I_{QR}$ to be reduce the current $I_{QR}$ to zero during the overlap period θt is; $\sin(θt) > I_{QR}/I_{max}$, as represented by the symbol C in FIG. 9.

In order to achieve ZCS (zero current switching), it is necessary that the current $I_{QR}$ of the switching element $Q_R$ at the commutation source becomes zero within the period of the overlap period θt, and it is further required that the resonant current $I_{CL}$ for reducing the current $I_{QR}$ is at least larger than the current $I_{QR}$ at the last point of the overlap period θt and the condition of $I_{CL} > I_{QR}$ should be satisfied. According to the relationship of $I_{CL} = I_{max}\sin(θt)$, this condition is expressed by; $\sin(θt) > I_{QR}/I_{max}$.

Next, with reference to the timing chart of FIG. 10, an example of the commutation operation according to the current source inverter of the present invention will be explained. This example indicates the commutation operation between the switching element $Q_R$ and the switching element $Q_S$ during the operation modes 4, 5, and 6 as shown in FIG. 6.

Here, the switching element $Q_R$ is assumed as the switching element at the commutation source, and the switching element $Q_S$ is assumed as the switching element at the commutation target. The current source inverter controls the commutation operation to generate the overlap period during when both the switching element $Q_R$ at the commutation source and the switching element $Q_S$ at the commutation target are set to be the ON state, and allows forward current to flow into the resonant circuit 71, the current flowing when the switching element $Q_S$ at the commutation target becomes the ON state, thereby generating resonant current in the resonant circuit in sync with the commutation operation, and supplying thus generated resonant current into the switching element $Q_R$ at the commutation source.

The commutation period during when both the switching element $Q_R$ at the commutation source and the switching element $Q_S$ at the commutation target are set to be the ON state, is assumed as the time from the rising edge of the gate pulse signal $G_S$ (FIG. 10B) of the switching element $Q_S$, until the falling edge of the gate pulse signal $G_R$ (FIG. 10A) of the switching element $Q_R$, and the time when the gate pulse signal $G_R$ (FIG. 10A) of the switching element $Q_R$ is in the ON state and the time when the gate pulse signal $G_S$ (FIG. 10B) of the switching element $Q_S$ is in the ON state overlap one another in time, thereby generating the overlap period.

Therefore, the switching element $Q_S$ is turned ON before the switching element $Q_R$ is switched from the ON state to the OFF state, and within the overlap period θt (operation mode 5), both the switching element $Q_R$ and the switching element $Q_S$ are in the ON state concurrently.

Hereinafter, in a similar manner as explained with reference to FIG. 4, an explanation will be made as to each of the period A, period B, period C, and period D in FIG. 10. The period A is associated with the operation mode 4, the period B is associated with a part of the operation mode 5, the period C is associated with the remaining part of the operation mode 5, and the period D is associated with the operation mode 6.

(Period A):

During the period A as shown in FIG. 10, the switching element $Q_R$ is in the ON state, and the current $I_{QR}$ flows in the switching element $Q_R$, and the current $I_{QS}$ (FIG. 10C) of the switching element $Q_S$ does not flow.

FIG. 11 illustrates the operating state and the current state of the switching elements during the period A. The current $I_{QR}$ of the switching element $Q_R$ is supplied to the three-phase transformer 51 as the primary current in R phase $I_R$, and returns via the switching element $Q_Z$.

(Period B):

According to the gate pulse signal $G_S$, the switching element $Q_S$ is set to be the ON state, and the current $I_{QS}$ starts flowing in the switching element $Q_S$. On this occasion, the current $I_{QS}$ of the switching element $Q_S$ increases by the time constant according to the inductance $L_{m2}$ and $L_C$, and therefore, at the time when the switching element $Q_S$ is turned to the ON state, ZCS (zero current switching) is performed (FIG. 10D).

By introducing the forward current $I_{QS}$ flowing in the switching element $Q_S$ in the ON state, into the resonant circuit 71, thereby generating the resonant current $I_{CL}$ in the resonant circuit 71 (FIG. 10G). The resonant current $I_{CL}$ thus generated is introduced into the switching element $Q_R$ at the commutation source in the reverse biased direction. The resonant current $I_{CL}$ being introduced is in the inverse direction relative to the forward current $I_{QR}$ in the switching element $Q_R$, and therefore, the resonant current $I_{CL}$ cancels the current $I_{QR}$ and it is reduced (FIG. 10C). The number 1 each enclosed within a circle in FIG. 10C and FIG. 10G indicates current components in the relationship canceling each other.

FIG. 12 illustrates the operating state and the current state of the switching elements during the period B. The current in the switching element $Q_S$ is introduced into the resonant circuit 71 via the terminal S, and the resonant circuit unit made up of a series connection between the capacitor $C_L$ and the reactor $L_C$ generates the resonant current $I_{CL}$. A part of the resonant current $I_{CL}$ is supplied to the three-phase transformer 51 as the primary current in R phase, and a part of the remaining current is supplied to the switching element $Q_R$ at the commutation source in the reverse biased direction.

The forward current in the switching element $Q_R$ is canceled by the resonant current, and the primary current $I_R$ according to a part of the resonant current, and primary current $I_S$ according to the switching element $Q_S$ are supplied to the three-phase transformer 51, and return via the switching element $Q_Z$.

(Period C):

The current $I_{QR}$ in the switching element $Q_R$ becomes zero current. A surplus of the resonant current flows into the freewheeling diode $D_R$ that is connected to the switching element $Q_R$ in parallel. The number 2 each enclosed within a circle in FIG. 10E and FIG. 10G indicates current components in the relationship being associated with one another.

Accordingly, the drain-to-source voltage of the switching element QR is kept to be zero voltage (FIG. 10F). During this period C, the overlap period is terminated at the falling edge of the gate pulse signal $G_R$ of the switching element $Q_R$ at the commutation source.

When the switching element $Q_R$ at the commutation source is turned OFF, the current $I_{QR}$ flowing in the switching element $Q_R$ is kept to be in the state of zero current, by the OFF state of the switching element $Q_R$ at the commutation source, in succession to the zero current state caused by the resonant current. Therefore, the switching element $Q_R$ at the commutation source achieves the ZCS (zero current switching).

In addition, the resonant current flows into the freewheeling diode $D_R$ of the switching element $Q_R$, thereby achieving ZVS (zero voltage switching) in the switching element QR at the commutation source. This period C is terminated at the time when the resonant current becomes zero.

FIG. 13 illustrates the operating state and the current state of the switching elements during the period C. The resonant current $I_{CL}$ cancels the forward current in the switching element $Q_R$ to establish zero current, and flows into the commutating diode $D_R$ to establish zero voltage. The primary current $I_R$ according to a part of the resonant current, and the primary current $I_S$ according to the switching element $Q_S$ are supplied to the three-phase transformer 51, and return via the switching element $Q_Z$.

(Period D):

At the time when the resonant current becomes zero, a DC voltage component is applied to the drain-to-source voltage $V_{QR}$ in the switching element $Q_R$ (FIG. 10F).

It is to be noted that as for the primary current in R phase $I_R$, commutation occurs during the period B, $I_R$ becomes the same current as $I_S$, another commutation occurs at the end of the period C, the current $I_{QR}$ is switched to the current $I_{QS}$ (FIG. 10(h)), and the current is supplied to the three-phase transformer 51 without interruption.

FIG. 14 illustrates the operating state and the current state of the switching elements during the period D. The resonant current $I_{CL}$ stops, and the primary current $I_S$ according to the switching element $Q_S$ is supplied to the three-phase transformer 51, and returns to the switching element $Q_Z$.

According to the aforementioned commutation operation, the resonant current of the resonant circuit is supplied to the switching element at the commutation source in the reverse biased direction, and supplied in the forward biased direction to the freewheeling diode which is connected with the switching element in inverse-parallel, thereby rendering the switching element at the commutation source to be zero current and zero voltage, and performing the commutation operation under the condition of zero current and zero voltage at the time when the switching element at the commutation source is switched from the ON state to the OFF state.

In the commutation operation of the present invention, when the overlap period during when both the switching elements are set to be the ON state is formed, there are considered multiple embodiments of the timing for driving the switching element at the commutation target and the switching element at the commutation source. By way of example, following embodiments are conceivable; an embodiment of advancing the timing for switching the switching element at the commutation target from the OFF state to the ON state, an embodiment of deferring the timing for switching the switching element at the commutation source from the ON state to the OFF state, and an embodiment of advancing the timing for switching the switching element at the commutation target from the OFF state to the ON state, together with deferring the timing for switching the switching element at the commutation source from the ON state to the OFF state, and the like.

It is to be noted that the aforementioned embodiments and modification examples describe just one example of the current source inverter and the method for controlling the current source inverter according to the present invention, and the present invention is not limited to each of those embodiments.

Those embodiments may be variously modified based on the scope of the present invention, and these modifications are not excluded from the scope of the present invention.

Industrial Applicability

The current source inverter of the present invention may be applied to a power source for supplying electric power to a plasma generator.

EXPLANATION OF REFERENCES

1 CURRENT SOURCE INVERTER
2 AC SOURCE
3 OUTPUT CABLE
4 PLASMA GENERATOR
10 RECTIFIER
20 SNUBBER
30 CURRENT SOURCE STEP-DOWN TYPE CHOPPER
40 MULTIPHASE INVERTER
41 INVERTER CIRCUIT
41 INVERTER CIRCUIT
50 MULTIPHASE TRANSFORMER
51 THREE-PHASE TRANSFORMER
60 MULTIPHASE RECTIFIER
70 RESONANT CIRCUIT
71 RESONANT CIRCUIT
72 RESONANT CIRCUIT
80 CONTROL CIRCUIT
81 SWITCHING CONTROLLER
90 WIRING IMPEDANCE
100 CURRENT SOURCE INVERTER

101 CURRENT SOURCE STEP-DOWN TYPE CHOPPER CIRCUIT
102 THREE-PHASE INVERTER CIRCUIT
103 THREE-PHASE TRANSFORMER

What is claimed is:

1. A current source inverter comprising,
a current source chopper constituting a DC source,
a multiphase inverter for converting a DC output from the current source chopper into multiphase AC power according to an operation of multiple switching elements,
a controller for controlling the current source chopper and the multiphase inverter, and
a resonant circuit for supplying resonant current to the switching elements of the multiphase inverter, wherein,
when commutation is performed between the switching elements of the multiphase inverter, the controller controls a timing for driving a switching element at the commutation source and a switching element at the commutation target which commutate between phases, thereby generating an overlap period during when the switching element of one phase at the commutation source and the switching element of the other phase at the commutation target are set to be ON state, and controlling the resonant current of the resonant circuit,
in both the switching element at the commutation source and the switching element at the commutation target which commutate between phases, forming a closed circuit with the switching element of one phase at the commutation source, the switching element of the other phase at the commutation target, and the resonance circuit,
during the overlap period, the resonant current of the resonant circuit is supplied to the switching element at the commutation source, in a reverse biased direction, and the resonant current is also supplied to a freewheeling diode connected to the switching element at the commutation source in inverse parallel, in a forward biased direction, thereby establishing zero current and zero voltage in the switching element at the commutation source during the overlap period, and
a commutation operation at the time when the switching element at the commutation source is switched from the ON state to OFF state is performed under the condition of zero current and zero voltage, wherein the multiphase inverter is for converting DC power into n-phase AC power,
a phase component $\theta t$ of the overlap period satisfies $\pi/2n\ \theta t$ as a condition for preventing short circuit between the switching elements, and
satisfies $\sin(\theta t) >$ (phase current of the multiphase inverter)/(a maximum peak value of resonant current) as a condition for reducing forward current to zero, the forward current flowing to the switching element at the commutation source within the overlap period.

2. The current source inverter according to claim 1, wherein,
the resonant circuit is provided with current feed ends, the number of current feed ends being equal to the number of phases of the AC power converted by the multiphase inverter,
the current feed ends are respectively connected to connection terminals of the opposed switching elements in a bridge configuration of the switching elements forming the multiphase inverter, and
at the time of commutation between the switching elements of the multiphase inverter, the resonant circuit supplies current from a current feed end connected to the switching element at the commutation target into the resonant circuit, generates a resonant current, and leads the resonant current from the current feed end connected to the switching element at the commutation source to the closed circuit, thereby, the resonant current is supplied to the switching element at the commutation source, in the reverse biased direction of the switching element.

3. The current source inverter according to claim 2, wherein,
the resonant circuit comprises an LC series circuit provided in each between terminals formed by the current feed ends, and
upon commutation between the switching elements of the multiphase inverter, the LC series circuit inputs forward current of the switching element at the commutation target, generates resonant current, and supplies the resonant current thus generated to the switching element at the commutation source in the reverse biased direction.

4. The current source inverter according to claim 3, wherein,
the multiphase inverter is for converting DC power into n-phase AC power,
the resonant circuit has a condition for preventing the resonant current from flowing into another switching element that is set to be the ON state next, the condition being that the reactance L and the capacitance C of the LC series circuit constituting the resonant circuit are expressed with regard to a drive angular frequency $\omega_I$ of the multiphase inverter in n-phase, as the following: $(L \times C)^{1/2} < 1/(n \times \omega_I)$.

5. The current source inverter according to any one of claims 1 to 4, wherein,
the maximum peak value of the resonant current of the resonant circuit is larger than a phase current value of each phase of the multiphase inverter.

6. A method for controlling a current source inverter for converting a DC output from a current source chopper into multiphase AC power, according to an operation of multiple switching elements held by a multiphase inverter, comprising the steps of, upon commutation between switching elements of the multiphase inverter,
generating an overlap period during when both a switching element at of one phase the commutation source and a switching element of the other phase at the commutation target are set to be ON state, by controlling a timing for driving the switching element at the commutation source and the switching element at the commutation target which commutate between phases, and controlling resonant current,
in both the switching element at the commutation source and the switching element at the commutation target which commutate between phases, forming a closed circuit with the switching element of one phase at the commutation source, the switching element of the other phase at the commutation target, and the resonance circuit,
supplying the resonant current to the switching element at the commutation source in a reverse biased direction during the overlap period, and supplying the resonant current also to a freewheel diode connected to the switching element at the commutation source in inverse parallel, in a forward biased direction, thereby rendering the switching element at the commutation source to be zero current and zero voltage during the overlap period, and performing a commutation operation under the condition of zero current and zero voltage when the switching element at the commutation source is switched from the ON state to OFF state, wherein, a phase component θt of the overlap period satisfies π/2n>θt, as a condition for preventing a short circuit between the switching elements, and satisfies sin(θt)> (phase current of the multiphase inverter/a maximum peak value of the resonant current), as a condition for reducing the forward current to zero, the forward current flowing in the switching element at the commutation source during the overlap period.

7. The method for controlling the current source inverter according to claim 6, wherein, the multiphase inverter comprises a bridge configuration of the switching elements, and a resonant circuit connected between connection terminals of the switching elements opposed to each other in the bridge configuration, upon commutation between the switching elements, introduces current for the switching element at the commutation target into the resonant circuit, and generates resonant current, and supplies the resonant current thus generated to the switching element at the commutation source in a reverse biased direction of the switching element, during the overlap period.

8. The method for controlling the current source inverter according to claim 6, wherein, the maximum peak value of the resonant current in the resonant circuit is larger than a phase current value of each phase of the multiphase inverter.

* * * * *